(12) United States Patent
Wood

(10) Patent No.: US 8,007,030 B2
(45) Date of Patent: Aug. 30, 2011

(54) FRAME EXTENSION DEVICE FOR REDUCING THE AERODYNAMIC DRAG OF GROUND VEHICLES

(76) Inventor: Richard Wood, Virginia Beach, VA (US)

(*) Notice: Subject to any disclaimer, the term of this patent is extended or adjusted under 35 U.S.C. 154(b) by 0 days.

(21) Appl. No.: 12/386,289

(22) Filed: Apr. 16, 2009

(65) Prior Publication Data

US 2009/0256386 A1    Oct. 15, 2009

Related U.S. Application Data

(63) Continuation-in-part of application No. 11/654,277, filed on Jan. 17, 2007, now Pat. No. 7,585,015.

(60) Provisional application No. 60/763,140, filed on Jan. 30, 2006.

(51) Int. Cl.
 *B62D 35/00* (2006.01)
(52) U.S. Cl. ............................ 296/180.4; 296/180.1
(58) Field of Classification Search ............. 296/180.1, 296/180.2, 180.4, 181.5; 180/903
 See application file for complete search history.

(56) References Cited

U.S. PATENT DOCUMENTS

| | | |
|---|---|---|
| 2,569,983 A | 12/1945 | Favre |
| 2,737,411 A | 3/1956 | Potter |
| 3,010,754 A | 11/1961 | Schumaicer |
| 3,415,566 A | 12/1968 | Kerrigan |
| 3,697,120 A | 10/1972 | Saunders |
| 3,854,769 A | 12/1974 | Saunders |
| 3,960,402 A | 6/1976 | Keck |
| 3,971,586 A | 7/1976 | Saunders |
| 3,999,797 A | 12/1976 | Kirsch et al. |
| 4,006,932 A | 2/1977 | McDonald |
| 4,113,299 A | 9/1978 | Johnson et al. |
| 4,131,309 A | 12/1978 | Henke |
| 4,142,755 A | 3/1979 | Keedy |
| 4,170,378 A | 10/1979 | Jacobsen |
| 4,210,354 A | 7/1980 | Canning |
| 4,214,787 A | 7/1980 | Chain |
| 4,257,641 A | 3/1981 | Keedy |
| 4,316,630 A | 2/1982 | Evans |
| 4,320,920 A | 3/1982 | Goudey |
| 4,401,338 A | 8/1983 | Caldwell |
| 4,433,865 A | 2/1984 | Crompton, Jr. |

(Continued)

FOREIGN PATENT DOCUMENTS

DE    3115742 A1    11/1919

(Continued)

OTHER PUBLICATIONS

Lurking: "Reynolds number and Leading-Edge Bluntness on a 65° Delta Wing"; 40th AIAA Aerospace Sciences Meeting & Exhibit; Jan. 14, 2002; 16 pages.

*Primary Examiner* — Glenn Dayoan
*Assistant Examiner* — Gregory Blankenship
(74) *Attorney, Agent, or Firm* — Williams Mullen

(57) ABSTRACT

A frame extension device for the reduction of aerodynamic drag and for improved performance of bluff base ground vehicles by increasing the pressure on the base of the vehicle by stabilizing the wake flow. The device is particularly suited for tractor-trailers utilizing a roll-up type rear door in that it does not block any part of the door opening. The device may be of sufficient thickness to support the weight of an unloading device.

11 Claims, 14 Drawing Sheets

U.S. PATENT DOCUMENTS

| | | |
|---|---|---|
| 4,451,074 A | 5/1984 | Scanlon |
| 4,458,936 A | 7/1984 | Mulholland |
| 4,508,380 A | 4/1985 | Sankrithl |
| 4,553,781 A | 11/1985 | Johnson |
| 4,601,508 A | 7/1986 | Kerian |
| 4,682,808 A | 7/1987 | Bilanin |
| 4,688,841 A | 8/1987 | Moore |
| 4,702,509 A | 10/1987 | Elliott, Sr |
| 4,741,569 A | 5/1988 | Sutphen |
| 4,756,256 A | 7/1988 | Rains et al. |
| 4,818,015 A | 4/1989 | Scanlon |
| 4,978,162 A | 12/1990 | Labbe |
| 5,058,945 A | 10/1991 | Elliott et al. |
| 5,236,347 A | 8/1993 | Andrus |
| 5,240,306 A | 8/1993 | Flemming |
| 5,280,990 A | 1/1994 | Rinard |
| 5,332,280 A | 7/1994 | DuPont et al. |
| 5,348,366 A | 9/1994 | Baker et al. |
| 5,375,903 A | 12/1994 | Lechner |
| 5,487,586 A | 1/1996 | Kinkaide |
| 5,498,059 A | 3/1996 | Switlik |
| 5,658,038 A | 8/1997 | Griffin |
| 5,685,597 A | 11/1997 | Reid |
| 5,823,610 A | 10/1998 | Ryan et al. |
| 5,908,217 A | 6/1999 | Englar |
| 5,947,548 A | 9/1999 | Carper et al. |
| 6,092,861 A | 7/2000 | Whelan |
| 6,257,654 B1 | 7/2001 | Boivin |
| 6,286,892 B1 | 9/2001 | Bauer et al. |
| 6,286,894 B1 | 9/2001 | Kingham |
| 6,309,010 B1 | 10/2001 | Whitten |
| 6,409,194 B1 | 6/2002 | Voas |
| 6,409,252 B1 | 6/2002 | Andrus |
| 6,428,084 B1 | 8/2002 | Liss |
| 6,457,766 B1 | 10/2002 | Telnack |
| 6,467,833 B1 | 10/2002 | Travers |
| 6,485,087 B1 | 11/2002 | Roberge et al. |
| 6,595,578 B1 | 7/2003 | Calsoyds et al. |
| 6,616,218 B2 | 9/2003 | Bauer et al. |
| 6,666,498 B1 | 12/2003 | Whitten |
| 6,742,616 B2 | 6/2004 | Leban |
| 6,789,839 B1 | 9/2004 | Samuelson |
| 6,799,791 B2 | 10/2004 | Reiman et al. |
| 6,854,788 B1 | 2/2005 | Graham |
| 6,877,793 B2 | 4/2005 | Cory |
| 6,959,958 B2 | 11/2005 | Basford |
| 6,974,178 B2 | 12/2005 | Ortega et al. |
| 6,979,049 B2 | 12/2005 | Ortega et al. |
| 7,008,004 B2 | 3/2006 | Ortega et al. |
| 7,008,005 B1 | 3/2006 | Graham |
| 7,093,889 B2 | 8/2006 | Graham |
| 7,104,591 B1 | 9/2006 | Sanns |
| 7,147,270 B1 | 12/2006 | Andrus et al. |
| 7,207,620 B2 | 4/2007 | Cosgrove et al. |
| 7,240,958 B2 | 7/2007 | Skopic |
| 7,497,502 B2 | 3/2009 | Wood |
| 7,585,015 B2 * | 9/2009 | Wood .................. 296/180.4 |
| 7,618,086 B2 * | 11/2009 | Breidenbach ............. 296/180.4 |
| 7,740,303 B2 | 6/2010 | Wood |
| 2003/0205913 A1 | 11/2003 | Leonard |
| 2005/0040669 A1 | 2/2005 | Wood |
| 2006/0232102 A1 | 10/2006 | Steel |
| 2009/0200834 A1* | 8/2009 | Vogel et al. ................. 296/180.3 |
| 2009/0236872 A1* | 9/2009 | Wood .................. 296/180.1 |
| 2009/0256386 A1* | 10/2009 | Wood .................. 296/180.1 |
| 2009/0295189 A1* | 12/2009 | Distel et al. ................. 296/180.1 |

FOREIGN PATENT DOCUMENTS

| | | |
|---|---|---|
| GB | 2063799 A | 6/1981 |
| GB | 2098558 A | 11/1982 |
| JP | 11115830 | 4/1999 |
| WO | WO 2004062953 | 7/2004 |

\* cited by examiner

FRAME EXTENSION DEVICE FOR REDUCING THE AERODYNAMIC DRAG OF GROUND VEHICLES

CROSS-REFERENCE TO RELATED APPLICATION

This application is a continuation-in-part of prior application U.S. application Ser. No. 11/654,277 titled "Frame extension device for reducing the aerodynamic drag of ground vehicles," filed on Jan. 17, 2007 now U.S. Pat. No. 7,585,015, which claimed the benefit of U.S. Provisional Application No. 60/763,140, filed Jan. 30, 2006, the entire contents of both of which are incorporated herein by reference.

ORIGIN OF THE INVENTION

The invention described herein was made by employees of the United States Government, and may be manufactured and used by or for the Government without payment of any royalties thereon or therefore.

FIELD OF INVENTION

The invention relates to the reduction of aerodynamic drag for moving ground vehicles; specifically to an improved method and device for the reduction of aerodynamic drag and for improved performance of ground vehicles by increasing the pressure on the base area of a vehicle or vehicle component by controlling the flow in wake of the vehicle or vehicle component.

BACKGROUND OF THE INVENTION

There have been attempts to reduce the aerodynamic drag associated with the bluff base of the trailer of a tractor-trailer truck system. The wake flow emanating from the bluff base trailer is characterized as unsteady and dynamic. The unsteady nature of the wake flow is a result of asymmetric and oscillatory vortex shedding of the side surface and top surface flow at the trailing edge of the top and side surfaces of the vehicle. The boundary-layer flow passing along the top and side surfaces of the vehicle is at a low energy state and is unable to expand around the corner defined by the intersection of the side or top surfaces with the base surface. The boundary-layer flow separates at the trailing edge of the top and side surfaces and forms rotational-flow structures that comprise the bluff-base wake flow. The low energy flow separating at the trailing edges of the side surfaces and top surface of the trailer is unable to energize and stabilize the low energy bluff-base wake flow. The large rotational-flow structures comprising the wake interact with each other imparting an unsteady pressure loading on the vehicle base. The resulting flow interaction in the vehicle wake and unsteady pressure loading on the vehicle base contributes to the low pressures acting on the vehicle base and therefore high drag force. The resulting bluff-base wake-flow structure emanating from the base area of the vehicle is comprised of the vortex structures that are shed from trailing edges of the side surfaces and top surface of the vehicle. Contributing to the low-energy bluff-base wake is the low-energy turbulent flow that exits from the vehicle undercarriage at the base of the vehicle. The unsteady wake flow imparts a low pressure onto the aft facing surface of the trailer base that results in significant aerodynamic drag. Conventional approaches have addressed the bluff base flow phenomena by adding to or installing various devices to the bluff base region. Examples of these devices are: a contoured three-dimensional aerodynamic surface referred to as a boat-tail; bluff base extensions/flaps/fairings/panels/plates which extend rearward from the side, top and/or lower surfaces that create a cavity; three or four surface panels/plates that extend rearward from the bluff base and are aligned approximately parallel to the side, top and/or lower surfaces of the vehicle and are designed to trap vortices shed from the trailing edges. All of these previous devices are designed to be folded or stowed from the base area of the vehicle in order to provide access to the rear doors of the vehicle. Prior art also show the forcing the side surface and top surface flow into the base region through the use of turning vanes or jets of air.

Conventional approaches have used the aerodynamic boat-tail fairings applied to the trailer base in order to eliminate flow separation and associated drag, see, e.g., U.S. Pat. Nos. 2,737,411, 4,006,932, 4,257,641, 4,451,074, 4,458,936, 4,508,380, 4,601,508, 4,741,569, 4,978,162, and 6,092,861. These representative aerodynamic boat-tail fairing devices, while successful in eliminating flow separation, are complex devices that are typically comprised of moving parts that require maintenance and add weight to the vehicle. These devices take a variety of form and may be active, passive, rigid, flexible and/or inflatable. These attributes have a negative impact on operational performance and interfere with normal operations of the vehicle.

Other concepts, as documented in U.S. Pat. Nos. 421,478, 4,682,808 and 5,348,366, consist of three or four plates/panels that are attached to the base of a trailer or extend from support mechanisms that are attached to the base of a trailer. These devices operate by trapping the separated flow in a preferred position in order to create an effective aerodynamic boat-tail shape. These representative trailer base devices, while successful in reducing the drag due to base flow are complex devices that are typically comprised of moving parts that require maintenance and add weight to the vehicle. All of these devices add significant weight to the vehicle. These attributes have a negative impact on operational performance and interfere with normal operations of the vehicle.

U.S. Pat. Nos. 2,569,983, 3,010,754, 3,999,797, and 5,280,990 apply a flow turning vane to the outer perimeter of the trailer base on the sides and top to direct the flow passing over the sides and top of the trailer into the wake in order to minimize the drag penalty of the trailer base flow. These devices provide a drag reduction benefit but they require maintenance and interfere with normal operations of the trailers fitted with swinging doors. These devices also add weight to the vehicle that would have a negative impact on operational performance of the vehicle.

Several concepts employ pneumatic concepts to reduce the aerodynamic drag of tractor-trailer truck systems. U.S. Pat. No. 5,908,217 adds a plurality of nozzles to the outer perimeter of the trailer base to control the flow turning from the sides and top of trailer and into the base region. U.S. Pat. No. 6,286,892 adds a porous surface to the trailer base and to the sides and top regions of the trailer abutting the trailer base. These porous surfaces cover a minimum depth plenum that is shared by the sides, top and base regions of the trailer. These two patents provide a drag reduction benefit but as with the other devices discussed previously these devices are complex devices, comprised of moving parts, interfere with normal operations of the truck and add weight to the vehicle. These characteristics of the devices result in a negative impact on the vehicle operational performance.

Other devices have been developed for use only with swinging doors, for example U.S. Pat. Nos. 5,498,059 and 6,257,654. These devices are not rigidly attached to the truck and are not of sufficient thickness to support a forklift or other device during unloading of the trailer.

PCT Publication WO 2004/062953 discloses an aerodynamic reduction device for use on a tractor-trailer having a roll-up door. The device is comprised of panels on three sides of the truck door, the top and each side. There is no disclosure, however, of a panel along the bottom of the door to permit the truck to back up to a loading dock or that has sufficient thickness to support a forklift or other device during unloading of the trailer.

SUMMARY OF THE INVENTION

The invention relates to an aerodynamic frame extension device for reducing aerodynamic drag when attached to the aft surface of a vehicle. The device includes a non-foldable frame structure formed of rigid panels affixed substantially around the perimeter of the aft surface of the vehicle. The panels have a thickness of at least 1% of the width of the vehicle.

In a particular embodiment, the device is affixed to the aft surface of a vehicle having a rear door, that is, it is attached to the aft surface of the rear door frame. In this embodiment, the frame structure of the device has a vertical height equal to at least the vertical height of the rear door opening and a width equal to at least the width of the rear door opening so as not to interfere with the opening. The panel of the device nearest the bottom of the door frame has sufficient thickness to support a device for loading and unloading the vehicle.

The panels may have various shapes and profiles, such as a linear tapering profile, a step-wise profile, or a curved profile. The panels may be integrally formed together to form a single piece frame and the device may be integrally formed with the aft surface of the vehicle. The device will typically have a length of about 6 to 60 inches and a thickness of at least about 1% of the vehicle length. The device may be formed of any structurally sound material, such as metal, wood, plastic, composite, rubber, or ceramic material.

One aspect of the invention is to prohibit the interaction of naturally occurring large-scale bluff-body wake flow structures by creating a non-ventilated cavity in the base area of a bluff base vehicle. The non-ventilated cavity creates a region at the base of the vehicle where the flow is stagnant and not significantly influenced by the unsteady trailing wake flow structures and low pressures. The pressure that is present in the non-ventilated cavity is greater than the pressure in the wake and this cavity pressure is exerted on the base of the vehicle resulting in a reduced base drag compared to the situation in which the cavity is not present. The invention is applicable to all bluff base ground vehicles including but not limited to busses, vans, panel trucks, sport utility vehicles, light trucks, heavy trucks, etc. For example, a class of vehicle that would benefit from this technology is tractor-trailer class 7 and 8 trucks, commonly referred to as heavy trucks. Heavy trucks are typically configured with a door at the rear or base of the trailer. This door may be either of the swing type or roll-up type. The present invention may be used on any heavy truck to reduce the aerodynamic drag, but the present invention is especially beneficial for heavy trucks with roll-up doors. The non-ventilated cavity can be constructed as a separate structure that is attached to the vehicle base or constructed as an integral part of the existing vehicle structure. For heavy trucks with roll-up doors, the present invention may be constructed as an integral part of the vehicle by either extending the heavy and rigid vehicle structure at the trailer base aft or by fabricating a longer vehicle and relocating the door forward of the vehicle base area. The present invention is uniquely suited to a tractor trailer that is configured with a rear roll-up door. A trailer with a roll-up door has a rigid door frame structure that supports the roll-up door mechanisms and provides trailer structural integrity. The present invention extends the structure of the roll-up door frame aft. The side, top and lower external surfaces that comprise the non-ventilated cavity may be shaped to control the flow in the base area of the vehicle as well as the vehicle wake flow and thereby increase the drag reduction potential of the invention. Several of the available flow control concepts are; vortex trapping, attached flow shaping, and trailing edge energizing. Representative geometry modifications of the present invention that improve the ability of the invention to control the external flow passing over the exterior surface are; to inset the outer surface of the invention from the trailer edge, to inset the outer surface of the invention with a series of inset steps, to linearly vary the wall thickness of the invention in the longitudinal direction, to radius the trailing edge of the invention, to add vortex generators to the outer surface near the trailing edge, and to add corrugations or serration to the outer surface near the trailing edge. The use of each of these geometric modifications to the present invention is dependent upon the vehicle geometry, operational requirements, and maintenance requirements.

The present invention extends aft from the bluff base of a vehicle a distance that is less than 60% of the vehicle width. Adding a single inset or multiple stepped insets results in trapped vortex structures that form a fluidic surface that allows the flow exiting the trailing edge of the side, bottom and top exterior surfaces of the trailer to expand into the base region and provide drag reduction, increased fuel economy and improved operational performance. The trailing edge geometric shaping promotes turning of the trapped-vortex external flow field thereby increasing the drag reduction benefit of the trapped vortex technology. Aerodynamic drag reduction is created by increasing the average pressure loading on the bluff-base aft-facing surface of the vehicle or vehicle component such as the trailer of a tractor-trailer truck. The invention relates to flow in the base region behind a bluff-base vehicle or vehicle component. The flow in the base region behind a bluff-base vehicle or vehicle component is a function of vehicle geometry, vehicle speed and the free stream flow direction.

The device provides improved performance for both the no crosswind condition, in which the air is still, as well as the condition when crosswind flow is present. For all moving vehicles that operate on the ground a crosswind flow is always present due to a combination of atmospheric and environmental factors and the interaction of the naturally occurring wind with stationary geological and manmade structures adjacent to the vehicle path as well as interfering flows from adjacent moving vehicles. The device is designed to reduce aerodynamic drag for the all cross wind conditions for single and multiple-component bluff-base vehicles. The subject device uses vortex flows to allow the flow passing along the exterior top, bottom, and side surfaces of a bluff-base ground vehicle to smoothly exit the vehicle at the trailing edge and pass into the wake. The subject device provides reduced aerodynamic drag for all of bluff-base ground vehicles.

An aspect of the invention is a simple device defined as a non-ventilated cavity that is comprised of four joined, orthogonal, thick, rigid panels that attach to the exterior surface of the bluff base of a ground vehicle or vehicle component.

A further aspect of the invention is a device that is comprised of four joined, orthogonal, thick, rigid panels that form a non-ventilated cavity on the base of the vehicle. To minimize impact of vehicle operations or maintenance the thickness and dimensions of the non-ventilated cavity are based upon the existing rear structure of a vehicle. For a tractor-trailer vehicle the invention is designed to match the geometric characteristics of the rear roll-up door frame. Each of the panels may be comprised of multiple elements or segments and/or may be contain local gaps, holes, cutouts, and/or bumps in order to accommodate specific vehicle or vehicle component geometry.

For ground vehicles such as tractor-trailer trucks, which have a cross-section shape that is predominately rectangular, the four panels will form a rectangular structure that matches the vehicle specific geometric features. The flow passing over this class of vehicle is parallel to the vehicle centerline and moving aft along the vehicle surface. Each of the panels may be comprised various segments that may vary in number, shape, width and orientation which is determined by vehicle geometry. The preferred embodiment of the invention is to have each panel, comprising the invention, located near the outboard edge of the vehicle base. The trailing edge shape of each panel shall be similar and is a function of vehicle geometry and operating conditions. The panel trailing edge shape may be either linear and parallel to the vehicle base surface, or may be defined as a complex geometric shape such as serrated, notched, curved, or saw-tooth shape to stabilize the wake shed from the panel trailing edge. The leading edge of each panel may be offset from the vehicle base surface to create a vent slot that will allow the high pressure air located inboard of the panel to flow outward to the low pressure region outboard of the panel.

The present invention is designed to be a maintenance free device that does not interfere with typical operational procedures or add additional operational procedures to ensure successful performance of the device. For ground vehicles, such as tractor-trailer trucks, which have a door or doors located on the vehicle base, the present invention may be permanently attached to the base. For application of the invention to vehicles with two swing doors on the base the present invention that is comprised of four joined panels would be configured to allow the doors to swing open for access to the trailer interior. For vehicles with a rollup door on the base the invention is permanently installed on the vehicle.

The reduction of aerodynamic drag, improved operational performance and improved stability of multiple component vehicles is obtained by increasing the pressure loading on the bluff base of the vehicle or vehicle component. The pressure loading on the bluff base is increased by eliminating the interaction of the separated flow structures and promoting the side, bottom and top surface flow to smoothly transition from the vehicle trailing edges and turn into the wake region. The flow control is accomplished by: moving the vehicle trailing edge aft of the vehicle base area, trapping a vortex structure on the rearward facing perimeter surface of the invention, trapping a vortex on the outward facing surface of the invention with inset panels and energizing the flow at the invention trailing edge to promote inboard turning of the flow into the base wake. More specifically, this invention relates to a device and method for reducing aerodynamic drag utilizing a non-ventilated cavity that is specifically shaped, sized, and orientated to inhibit the formation and interaction of large separated flow structures in the wake. The invention creates an extension of the vehicle surfaces resulting in a stabilization of the vehicle wake, reduced unsteady flow separation, increased pressures acting on the bluff base area and reduced vehicle aerodynamic drag. The structure and segmentation of the invention, the inset positioning of the panels, the streamwise extent of the panels, and the trailing edge shape of the panels are the primary design variables that are used to determine the drag reduction capability of the device.

The invention may be used to reduce the drag of all existing and future ground vehicles (e.g., cars with trailers, tractor-trailer trucks, trains, etc.) An aspect of the present invention is an aerodynamic frame extension device for reducing the aerodynamic drag when attached to a rear frame of a bluff base vehicle, the aft surface of the rear frame having a perimeter with a top, bottom and two sides. Such device may have a frame extension structure comprised of four panels integrally connected to each other, the frame extension structure being substantially permanently affixed to the perimeter of the aft surface of the rear frame, with a panel extending aft from each of the top, bottom, and two sides. The frame extension structure may have a vertical height equal to at least the vertical height of the rear frame and a width equal to at least the width of the rear frame. In addition, the panel nearest the bottom of the rear frame may have sufficient thickness to support a device for loading and unloading the vehicle and the remaining panels have a thickness of at least 1% of the width of the vehicle. In some embodiments, the panels on the top and bottom are substantially orthogonal to the panels on the two sides. Optionally, in cases in which the rear frame perimeter, with its top, bottom and two sides, defines a door opening, then the panels may extend aft from each of the top, bottom, and two sides without interfering with the door opening. In general, the panels may be formed of a rigid material, such as metal, wood, plastic, composite, rubber, or ceramic material. The panel nearest the bottom of the door frame may be formed of metal for supporting the loading and unloading of the vehicle. In some embodiments, the panels may be inset from the outer edge of the rear frame. Examples of inset embodiments include an inset of at least one inch from the outer edge of the door frame; an inset from the outer edge of the rear frame a distance of about 0-10% of the vehicle's width; and an inset from the outer edge of the rear frame a distance of about 0-5% of the vehicle's width. Optionally, the length of the device may be about 6 to about 60 inches. In some cases, the panels may be integrally connected for aerodynamic purposes; in other cases, the integrally connected panels may be rigid and are joined together into a single piece frame structure.

Several features of the present invention include:
    (a) reduction of aerodynamic drag of vehicles;
    (b) use of vortex flow to reduce aerodynamic drag;
    (c) reduction of aerodynamic drag and improved operational efficiency of vehicles;
    (d) reduction of aerodynamic drag and improved fuel efficiency of vehicles;
    (e) conservation of energy and improved operational efficiency of vehicles;
    (f) reduction of aerodynamic drag without a significant geometric modification to existing vehicles;
    (g) an aerodynamic drag reduction device that uses a minimum of panels;
    (h) variable geometric details of each panel to meet the specific needs of the application;
    (i) variable spacing, location, and orientation of each panel to meet the specific needs of the application;
    (j) reduction of aerodynamic drag of the present vehicle by creation of high pressure and low aerodynamic drag forces on the bluff base of a vehicle;
    (k) the device may be fabricated as a number of independent segments and parts that may be applied to an existing vehicle;
    (l) the device may be fabricated as a single independent unit that may be applied to an existing vehicle;

(m) the device may be fabricated as an integral part of a vehicle;

(n) each panel may be positioned on the vehicle base surface for optimal performance;

(o) the device adds minimal weight and volume to the vehicle;

(p) the device may automatically fold to a stowed position and deploy to a operational position with normal operation of the door system;

(q) the device requires minimal maintenance;

(r) the device has no impact on operational requirements.

BRIEF DESCRIPTION OF THE DRAWINGS

The invention will be better understood in relation to the attached drawings illustrating preferred embodiments, wherein.

DETAILED DESCRIPTION OF THE PREFERRED EMBODIMENT

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many shapes, widths, trailing edge shapes, and orientation of the panels, candidate vehicles that can benefit from the device, fabrication means and material, attachments means and material should be understood to fall within the scope of the present invention.

Referring now in detail to the drawings, like numerals herein designate like numbered parts in the figures.

Figure 1:
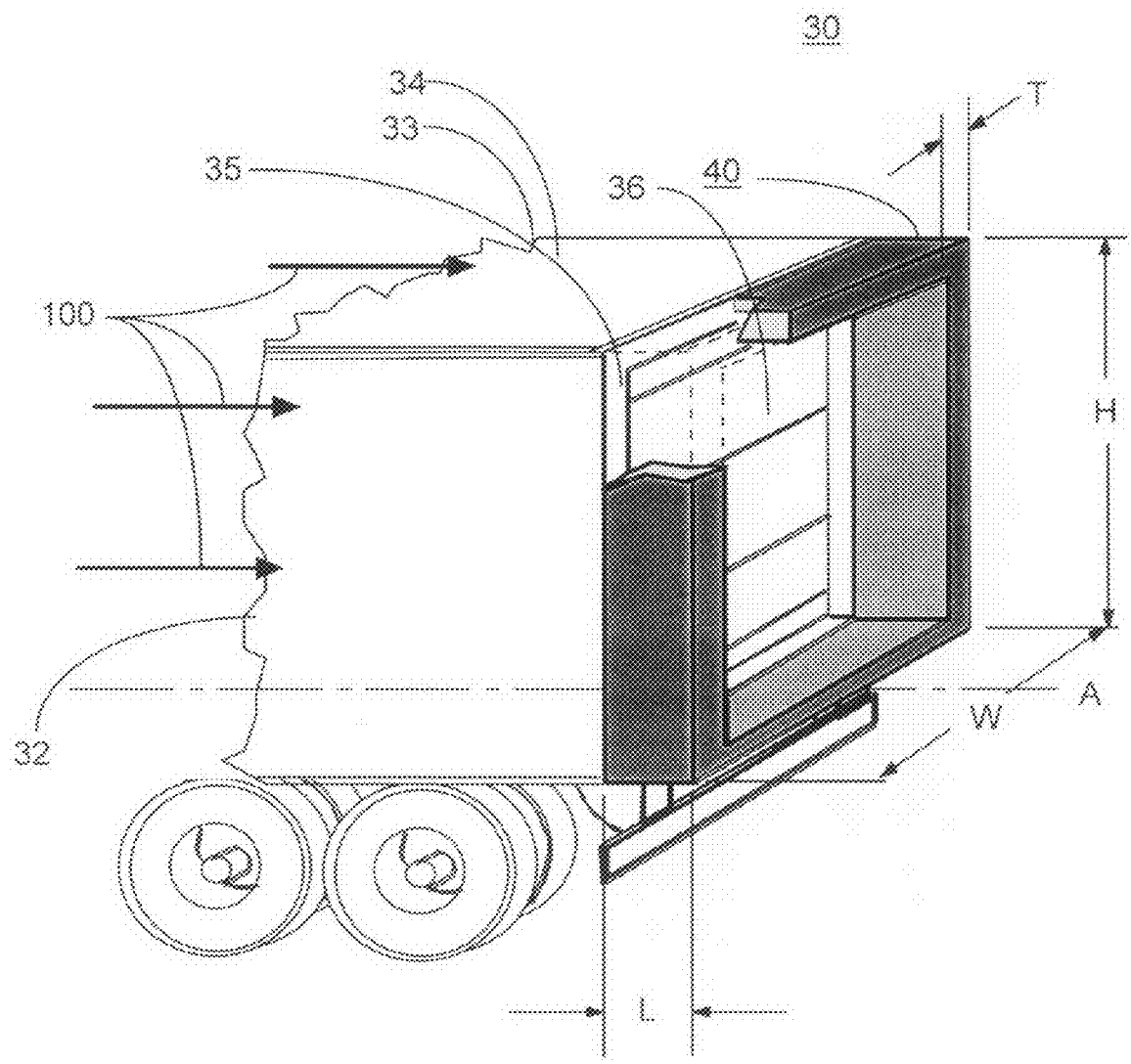
FIG. 1 is a rear perspective view of the aft most portion of a trailer of a tractor-trailer truck system with the present invention installed on the rear surface of the trailer.

FIG. 1 is a rear perspective view of the aft portion of a typical bluff based vehicle, such as trailer 30 of a tractor-trailer truck as shown, with an embodiment of the present invention installed on the rear frame 35 of a trailer 30. The invention 40 is a four-sided thick-walled orthogonal frame extension structure that is mounted to, or affixed/fabricated as an integral part of, the aft surface of existing rear frame 35 of the trailer 30. The present invention 40 is comprised of four orthogonal aft-extending rigid panels that are attached to vehicle rear frame 35, the aft surface of the rear frame 35 having a perimeter with a top, a bottom, and two sides. Accordingly, the baseline invention 40 has a width W, height H and a length L.

The height H of the invention 40 is somewhat equivalent to the full vertical height of the vehicle rear frame 35. The width W of the invention 40 is somewhat equivalent to the full width of the vehicle rear frame 35. The type, size and structure of the attachment hardware or process of the invention is determined by the geometric characteristics of the vehicle 30, the operational requirements of the vehicle 30 and the maintenance requirements of the vehicle 30, and as further described herein.

The present invention 40 provides aerodynamic drag reduction for all free stream flow 100 conditions including crosswind conditions. Aerodynamic drag reduction occurs when flow 100 that separates at the vehicle side surface 32, 33, top surface 34 and lower surface trailing edge is turned into the base wake region with the use of vortex trapping and trailing edge energizing flow control technologies located on the trailing edge and outer surface of the present invention 40. The flow 100 leaving the vehicle trailing edge forms a vortex that resides on the rearward facing surface of the invention 40. The trapped vortex located on invention 40 acts as a fluidic surface to the external flow that is turned into the wake region. The trapped vortices promote the turning of the external flow into the base wake region which results in a stable bluff-base wake flow and a high pressure that acts on the base surface, e.g., vehicle door 36 of trailer 30. The strength of the trapped vortices located on invention 40 will provide increasing aerodynamic drag reduction with increasing velocity of the flow 100. The effectiveness of the present invention to reduce drag and thereby increase fuel economy of a vehicle is determined by invention 40 width W, height H, and length L as shown in FIG. 1.

The length of the device is regulated by Department of Transportation, which currently limits the length of rigid structures not carrying cargo to 2 feet. Other lengths may, however, be effective for embodiments without such regulatory limitation. The device of the present invention could have a length of about 6 inches to about 60 inches depending on the requirements of the particular application. Preferably, the length is about 12 inches to about 30 inches. The height and width of the device is typically about the same as the height and width of the door frame. The thickness of the device is generally about 5% of the device length. Preferably, the device has a thickness of at least about 10% of its length. In one embodiment, the thickness is at least half of the thickness of the door frame and may be as thick as the door frame. For example, on a truck having a frame 6 inches thick, the device would typically have a thickness of about 3 to 6 inches. In another embodiment, the thickness of the device is at least about 1% of the vehicle width. For bluff base vehicles in which the rear frame perimeter, with its top, bottom, and two sides, defines a door opening, then it may be desirable to have an embodiment of the device wherein the panels extend aft from each of the top, bottom, and two sides without interfering with such door opening.

The maximum outer perimeter of the device is typically located coincident to or inset inboard of the vehicle base area outside edge perimeter. One aspect of the invention is an embodiment in which the device is inset from the vehicle base outer or outside edge perimeter 0-10% of the vehicle's width. Alternatively, an aspect of the invention is an embodiment in which the device is inset from the vehicle base outer edge perimeter 0-5% of the vehicle. In some embodiments, the device outside edge perimeter may be located inboard of the vehicle base outside edge perimeter, with the device outside edge located a distance that is equal to or less than about 3% of the vehicle width. In some embodiments, for example, such inset may also be at about one inch.

The device may be formed of any structurally rigid or sound material, such as metal, composites, or fiberglass. The load bearing portion of the device, i.e., the bottom panel and the upper corners would typically need to be of a material of sufficient strength to bear the required load. This would typically require these portions of the device to be formed of metal.

Figure 2A:
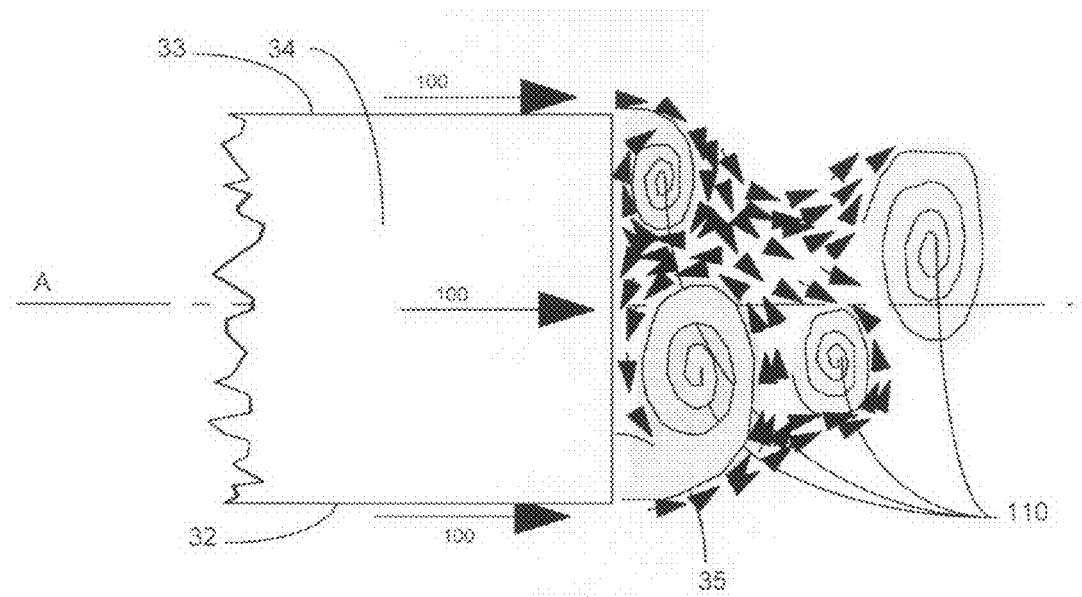
FIGS. 2A-2B are cross-section views, in planes horizontal to the ground and perpendicular to the ground, of the wake flow conditions for a tractor-trailer system without the present invention installed.
Figure 2B:
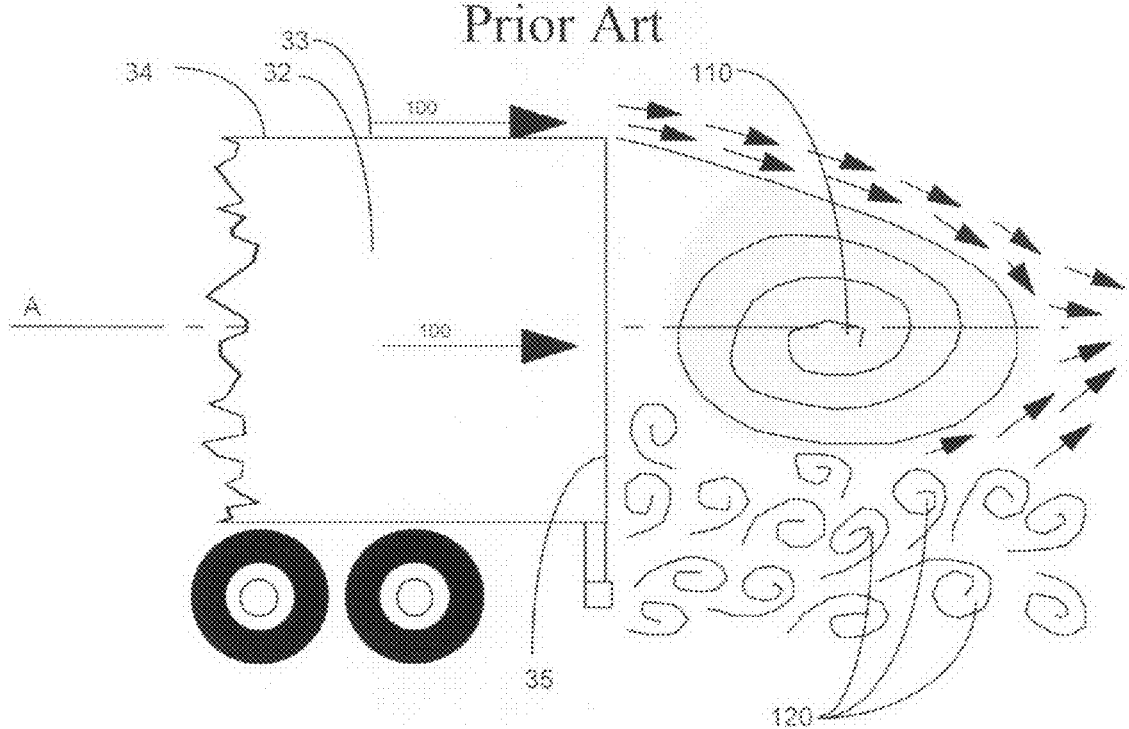

FIGS. 2A and 2B show flow patterns in the wake of a bluff-base vehicle without the present invention installed. In FIGS. 2A and 2B the airflow about the vehicle and in the base region is represented by arrow tipped lines and swirl structures 100, 110, and 120. The shaded swirl structures represent rotational wake flow 110. The small swirl structures represent turbulent flow structures 120 in the base area and from the vehicle undercarriage.

FIG. 2A shows a cross section view, in a plane horizontal to the ground, of the aft portion of a trailer 30 and the bluff-base wake flow, without the present invention installed. For this condition, a surface flow 100 develops on the trailer that separates at the trailing edge of the side surfaces 32 and 33, upper surface 34 and lower surface and forms rotational-flow structures 110 that comprise the bluff-base wake flow. The rotational-flow structures 110 are shed asymmetrically from the various trailer surfaces 32, 33 and 34. These rotational-flow structures 110 continue to move downstream in a random pattern. The asymmetric shedding of the rotational-flow structures 110 produce low pressures that act on the base surface 35 and 36 of the trailer. These low pressures result in a high aerodynamic drag force. The low energy flow 100 separating at the trailing edges of the trailer 30 is unable to energize and stabilize the low energy bluff-base wake flow. The resulting bluff-base wake-flow structure emanating from the base area of the vehicle is comprised of the vortex structures 110 that are shed from the trailing edges of the trailer 30. Contributing to the low-energy bluff-base wake is the low-energy turbulent flow 120 that exits from the vehicle undercarriage at the base of the vehicle.

FIG. 2B shows a centerline cross section view of the aft portion of a trailer 30 and the bluff-base wake flow, without the present invention installed. For this condition, a surface flow 100 develops on the trailer that separates at the trailing edge of the top surface 34 and forms rotational-flow structures 110 that comprise the bluff-base wake flow. The rotational-flow structures 110 that are shed from the trailing edge of the top surface 34 are asymmetrically located in the wake. These rotational-flow structures 110 continue to move downstream in a random pattern. The unsteady shedding of the rotational-flow structures 110 produce low pressures that act on the base surface 35 of the trailer. These low pressures result in a high aerodynamic drag force. The low energy flow 100 separating at the trailing edges of the top surface 34 of the trailer 30 is unable to energize and stabilize the low energy bluff-base wake flow. Contributing to the low-energy bluff-base wake is the low-energy turbulent flow 120 that exits from the vehicle undercarriage at the trailing edge of the vehicle. The resulting bluff-base wake-flow structure emanating from the base area of the vehicle is comprised of the vortex structures 110 that are shed from trailing edges of the side surfaces 32 and 33 and the top surface 34 of the vehicle. The low-energy turbulent flow 120 that exists from the vehicle undercarriage also enters into the bluff-base wake flow. The unsteady wake flow imparts a low pressure onto the aft facing surface 35 of the trailer base that results in significant aerodynamic drag.

Figure 3A:
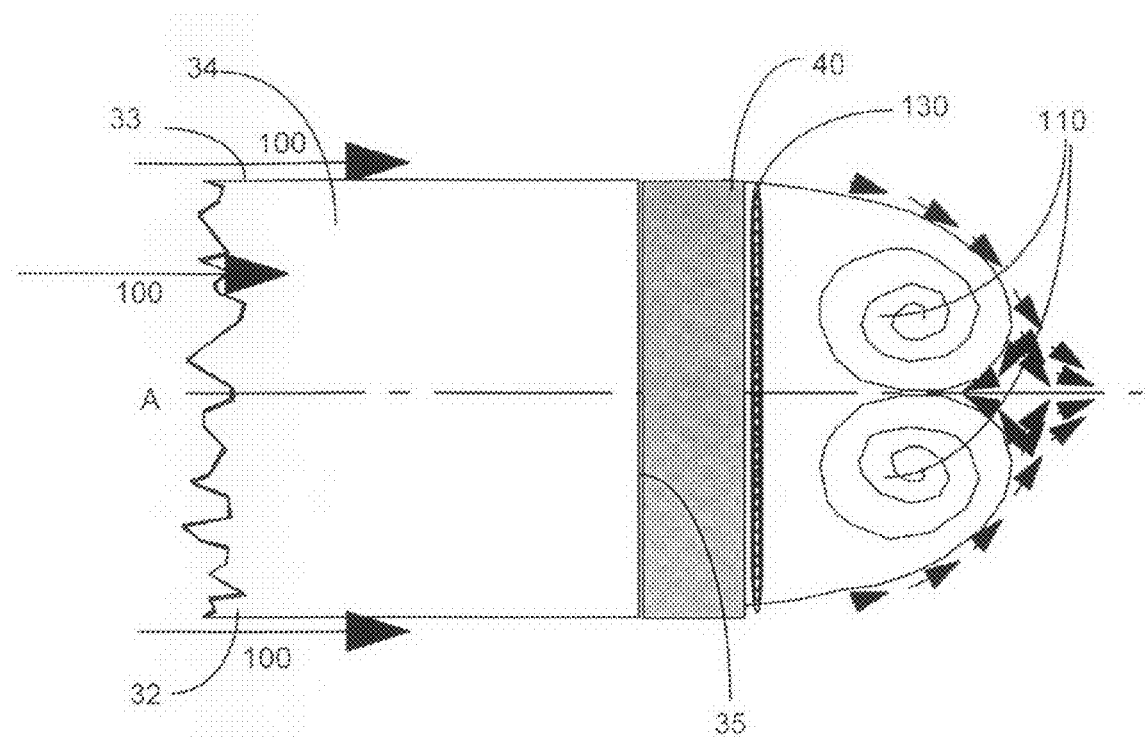
FIGS. 3A-3B are cross section views, in planes horizontal to the ground and perpendicular to the ground, of the wake flow conditions for a tractor-trailer system with the present invention installed.
Figure 3B:
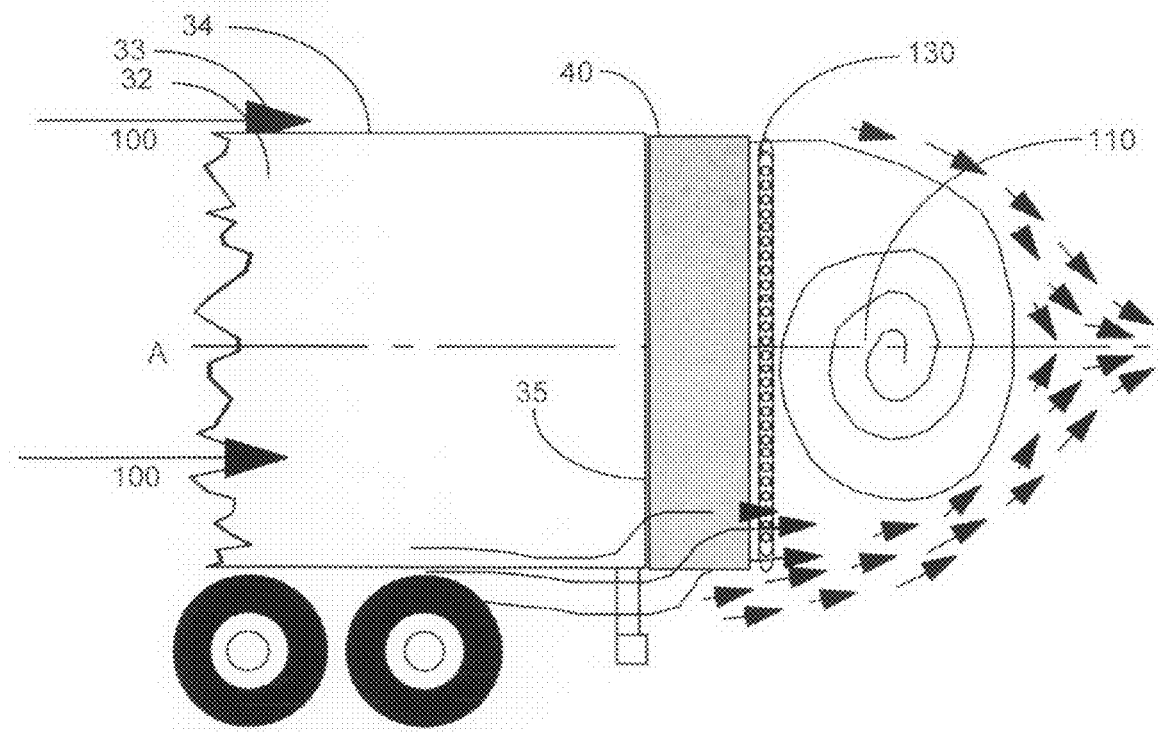

FIG. 3A and FIG. 3B show a top view and a side view of the aft portion of a trailer 30 as the bluff base vehicle and cross section views, in a plane horizontal to the ground and along the vehicle centerline, of the bluff-base wake flow, with the present invention 40 installed. The figure shows a surface flow 100 develops on the trailer 30 top surface 34 and side surfaces 32 and 33 that separates at the side and top surface trailing edges. The top and side surface flow 100 separates at the top and side surface trailing edge of the invention 40 and is trapped as a vortex 130 on the rearward facing thick surface of the invention 40. The top and side flow 100 that is external to the trapped vortex 130, is turned into the wake region by the trapped vortex 130. The turning angle and velocity of the side flow is a function of the strength of the trapped vortex 130 as well as various modifications to the invention 40 geometry. Increasing the top surface 34 and side surface 32 and 33 flow inboard turning angle and velocity allows for a reduction in the length L of the invention 40 which will allow for the top surface 34 and side surface 32 and 33 flow to turn into the base wake.

Figure 4A:
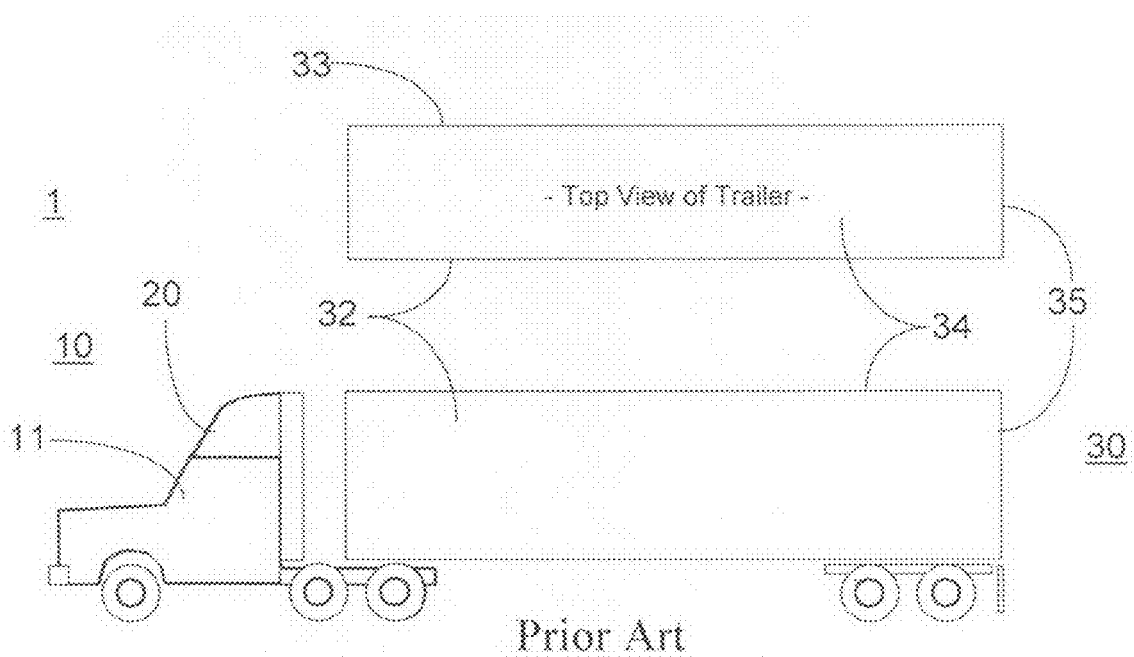
FIG. 4A-4D are side and top views of various ground vehicles with and without the present invention installed.
Figure 4B:
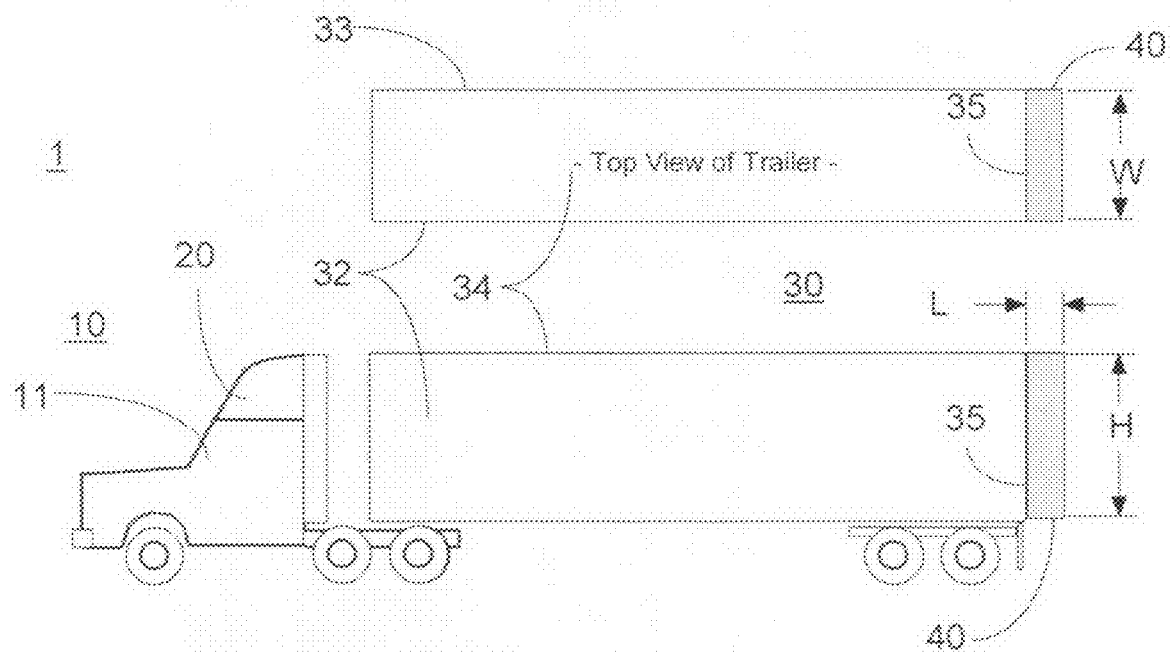
Figure 4C:
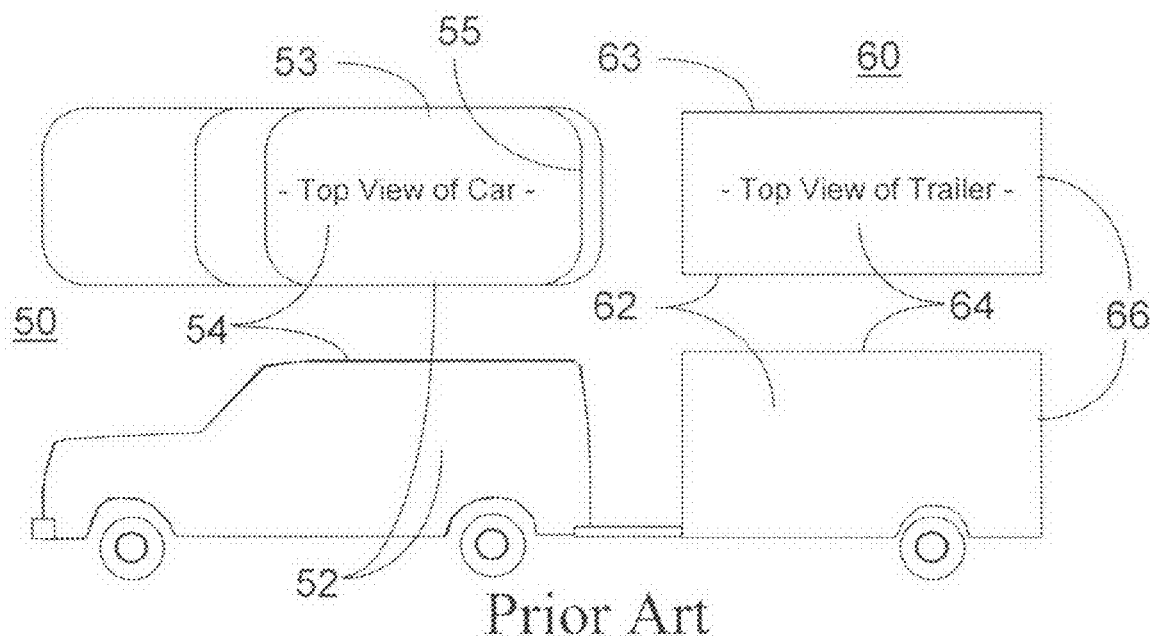
Figure 4D:
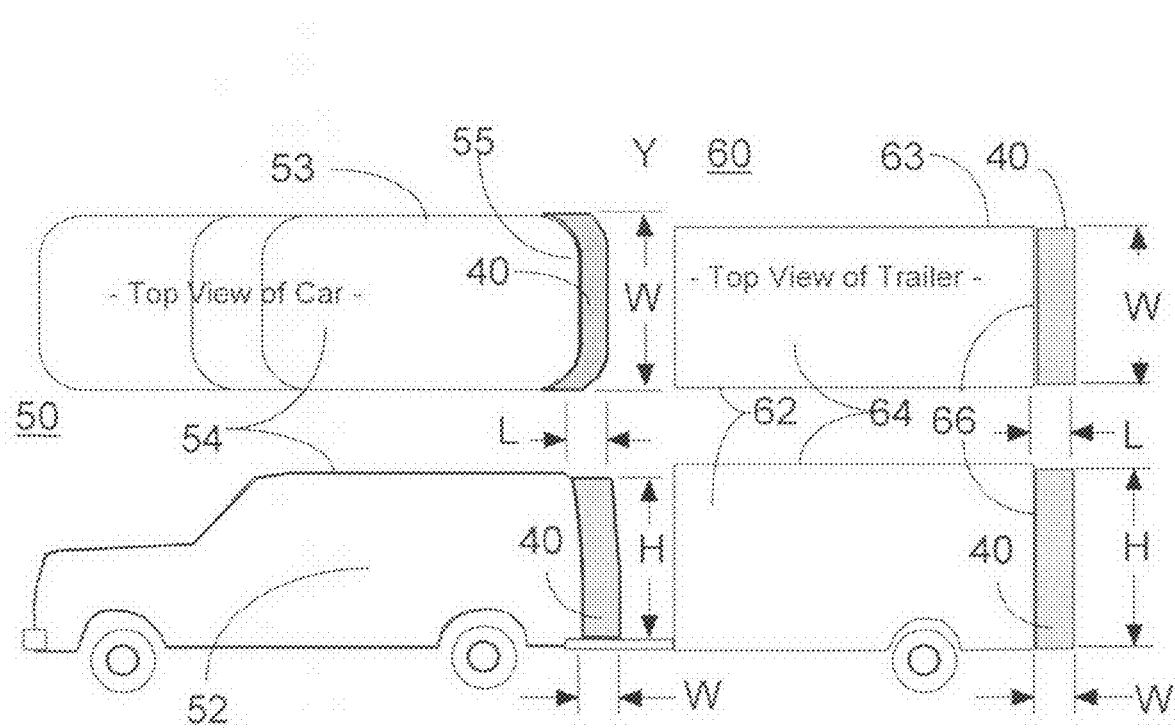

FIGS. 4A-D are side and top views of example of bluff base ground vehicles with and without the present invention installed. FIG. 4A shows a typical tractor-trailer truck system 1, comprised of a powered tractor 10 that pulls a trailer 30. The tractor 10 is comprised of a cab 11 and an aerodynamic fairing system 20 that may be an integral part of the tractor 10. FIG. 4B shows the same tractor-trailer truck system 1 as that of FIG. 4A with the present invention 40 installed on rear surface 35 of the trailer 30. The four joined, aft-extended, thick panels that comprise the invention 40 are symmetrically positioned about the centerline of the trailer 30, with the panels on the top and bottom being substantially orthogonal to the panels on the two sides. FIGS. 4C and 4D show an automobile 50 pulling a trailer 60 with and without the present invention 40 installed on both the rear frame bluff base of the automobile aft surface 55 and the trailer aft surface 66. The various vehicles depicted in FIG. 4 shows a powered vehicle towing/pulling an un-powered towed vehicle. Additionally, other multiple component vehicles may be considered than those depicted.

Figure 5A:
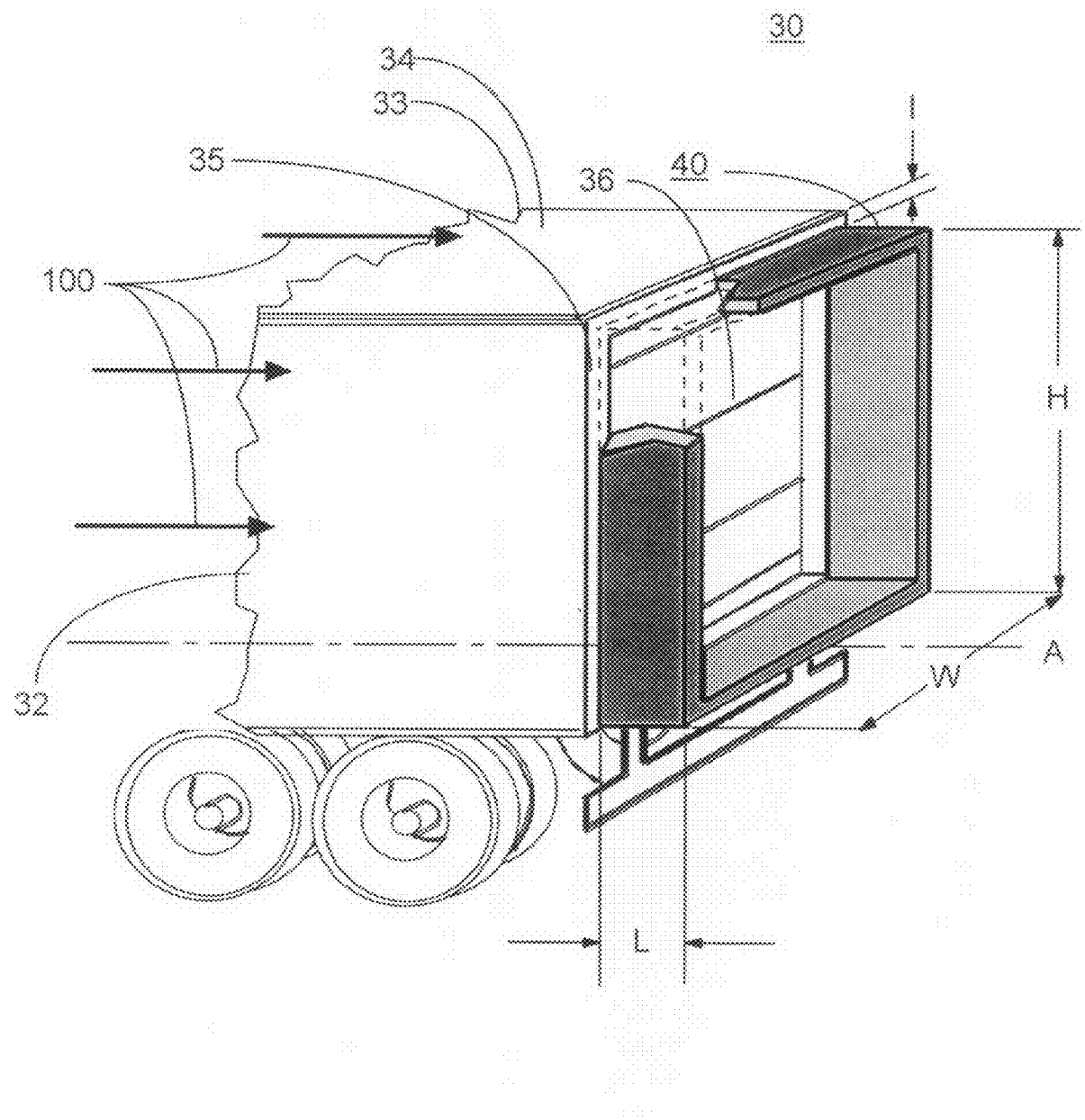
FIGS. 5A-5B are perspective and section view drawings of the inset variation for the present invention.
Figure 5B:
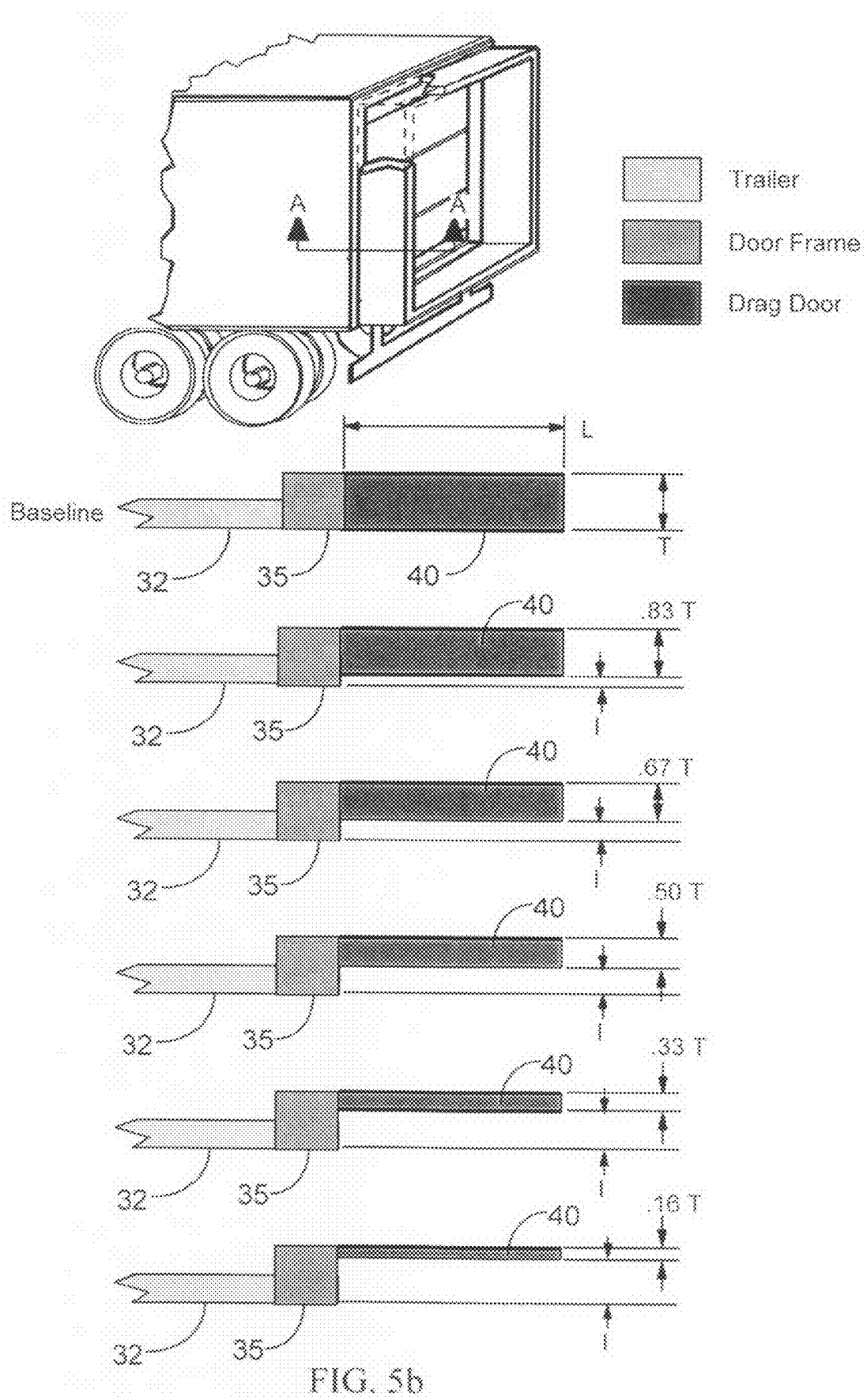

FIG. 5A shows a rear perspective view of the aft portion of a typical trailer 30 of a tractor-trailer truck with the present invention 40 that has been inset from the trailer side, top, and bottom base edges a distance I. The present invention 40 is installed on the aft surface of the rear frame 35 of a trailer 30. The invention 40 is comprised of four joined, orthogonal, aft-extended, thick panels and attachment hardware that are mounted to the aft surface of the rear frame 35 of the vehicle 30. The panels may be integrally connected in an aerodynamic sense, or fully joined together as a single piece frame structure. Shown in FIG. 5B is a horizontal section cut through the trailer 30 and present invention 40. Also shown in the figure are representative variations in the inset dimension I. While the inset distance is not a limiting feature of the invention, a typical inset distance would be about 1 to 3 inches.

The length L of the invention 40 is less than 60% of the width W of the vehicle 30. The width W and height H of the invention 40 is determined by the geometric characteristics of the vehicle 30, the operational requirements of the vehicle 30 and the maintenance requirements of the vehicle 30. The type, size and structure of the attachment hardware of the invention is determined by the geometric characteristics of the vehicle 30, the operational requirements of the vehicle 30 and the maintenance requirements of the vehicle 30.

The present invention 40 provides aerodynamic drag reduction for all free stream flow 100 conditions including crosswind conditions. Aerodynamic drag reduction occurs when flow 100 that separates at the vehicle top surfaces 34 and side surface 32, 33 trailing edge is turned into the base wake region with the use of vortex trapping flow control technologies that are created by the inset of the invention 40 outer facing surface from the outside edge of the vehicle base area. The flow 100 leaving the top surface 34 and side surface 32, 33 trailing edge forms a vortex that reside on the outward facing surface of the invention 40. The trapped vortex located on the invention 40 acts as a fluidic surface to the external flow that is turned into the wake region. The trapped vortices promote the turning of the external flow into the base wake region which results in a stable bluff-base wake flow and a high pressure that acts on the base door 36 of the trailer 30. The strength of the trapped vortices on invention 40 will provide increasing aerodynamic drag reduction with increasing velocity of the flow 100. The effectiveness of the present invention to reduce drag and thereby increase fuel economy of a vehicle is determined by panel 40 width W, height H, length L, and inset dimension I.

Figure 6A:
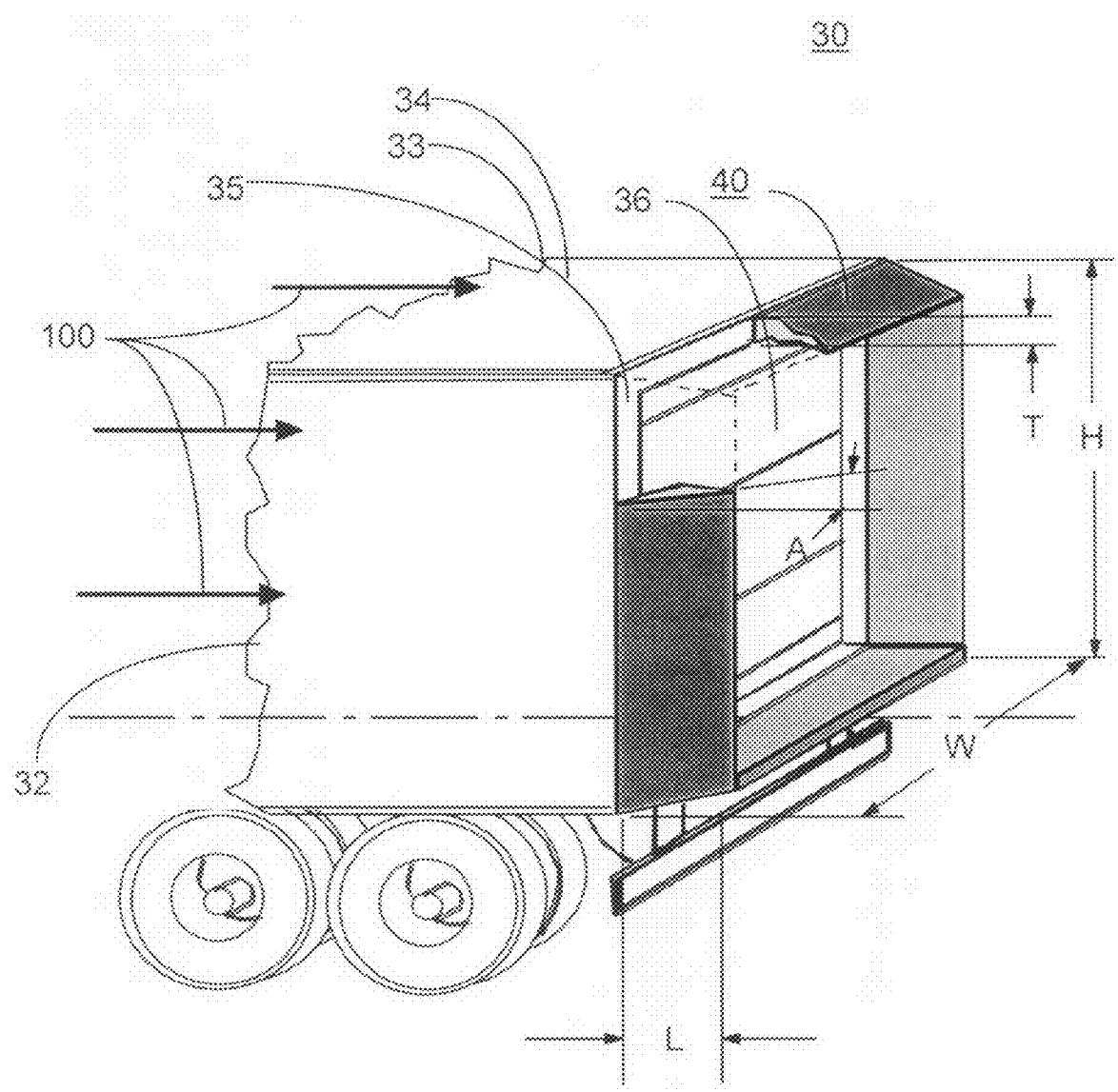
FIGS. 6A-6B are perspective and section view drawings of the linear thickness taper variation for the present invention.
Figure 6B:
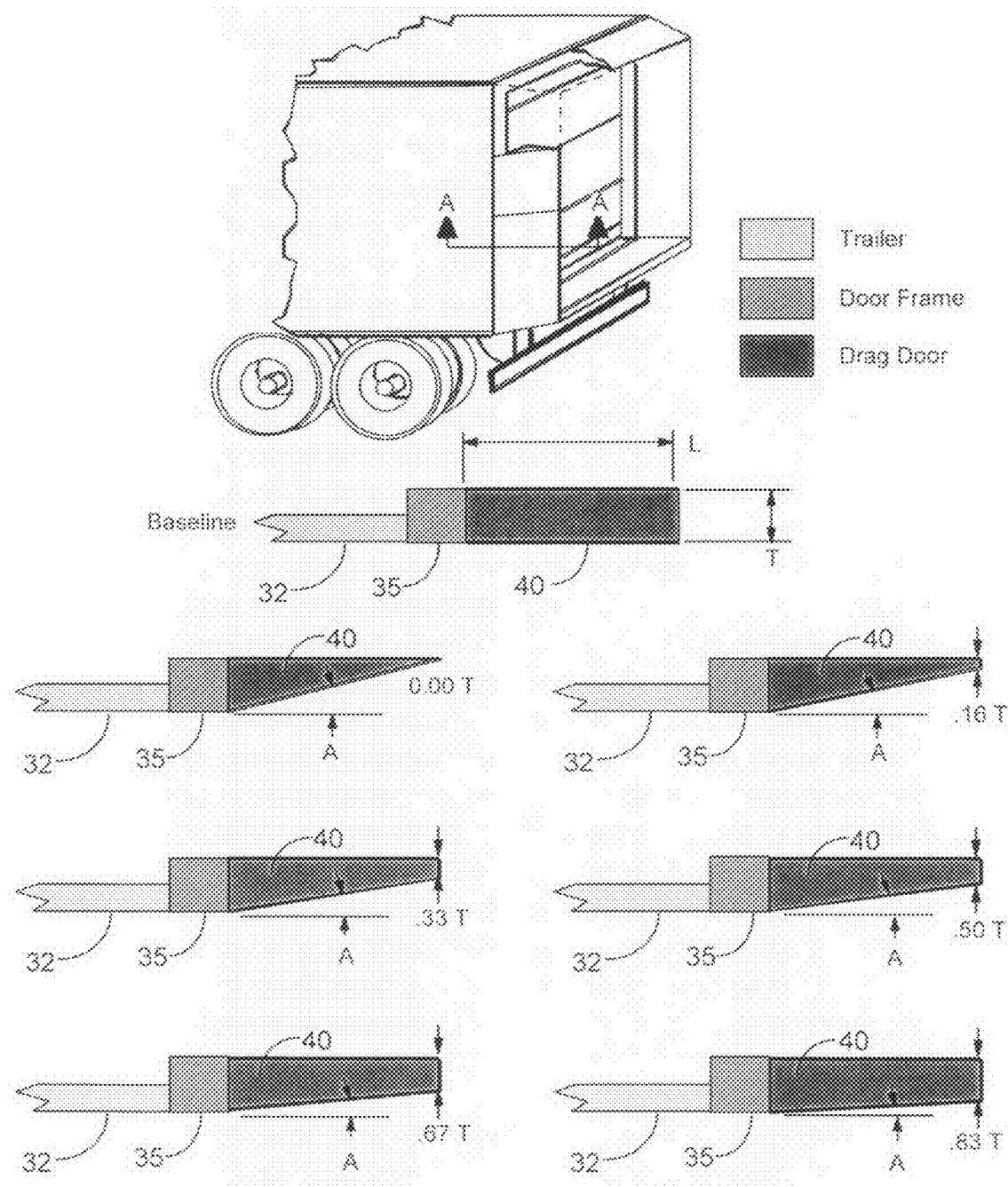

FIG. 6A shows a rear perspective view of the aft portion of a typical trailer 30 of a tractor-trailer truck with a modified version of the present invention 40 installed on the rear door frame 35 of a trailer 30. This alternate embodiment of the present invention 40 is a linearly tapering thickness in the stream-wise direction of each of the four joined, orthogonal, aft-extended, thick panels that comprise the invention 40. The linearly tapering thickness in the stream-wise direction of each of the four joined, orthogonal, aft-extended, thick panels results in a wedge angle A. The invention 40 is comprised of four joined, orthogonal, aft-extended, thick panels and attachment hardware that are mounted to the rear door frame 35 of the vehicle 30. Shown in FIG. 6B are horizontal section cuts through the trailer 30 and present invention 40 that show representative thickness variations for each of the four panels comprising the invention 40.

The length L of the invention 40 is less than 60% of the width W of the vehicle 30. The width W and height H of the invention 40 is determined by the geometric characteristics of the vehicle 30, the operational requirements of the vehicle 30 and the maintenance requirements of the vehicle 30. The type, size and structure of the attachment hardware of the invention is determined by the geometric characteristics of the vehicle 30, the operational requirements of the vehicle 30 and the maintenance requirements of the vehicle 30.

The present invention 40 provides aerodynamic drag reduction for all free stream flow 100 conditions including crosswind conditions. Aerodynamic drag reduction occurs when flow 100 that leaves the vehicle top surface 34 and side surface 32, 33 trailing edges is initially turned by the wedge angle on the present invention which improves the turning of the flow into the vehicles 30 base wake region. The flow 100 leaving the top surface 34 and side surface 32, 33 trailing edges remains attached as it moves stream-wise along the outer surface of the invention 40. The wedge angle promotes the turning of the external flow into the base wake region which results in a stable bluff-base wake flow and a high pressure that acts on the base door 36 of the trailer 30. The effectiveness of the present invention to reduce drag and thereby increase fuel economy of a vehicle is determined by panel 40 width W, height H, length L, and wedge angle A.

Figure 7A:
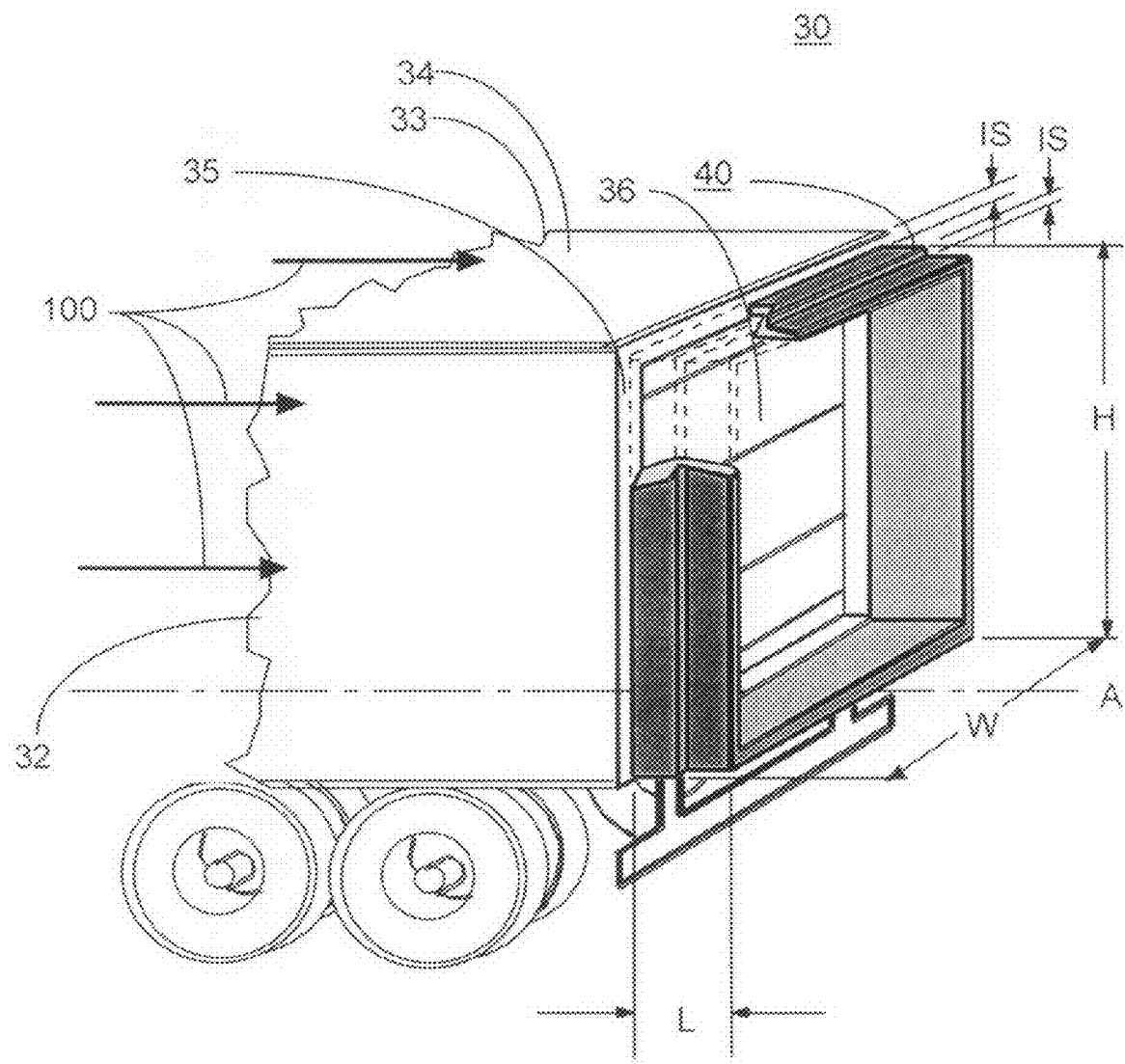
FIGS. 7A-7B are perspective and section view drawings of the stepped inset variation for the present invention.
Figure 7B:
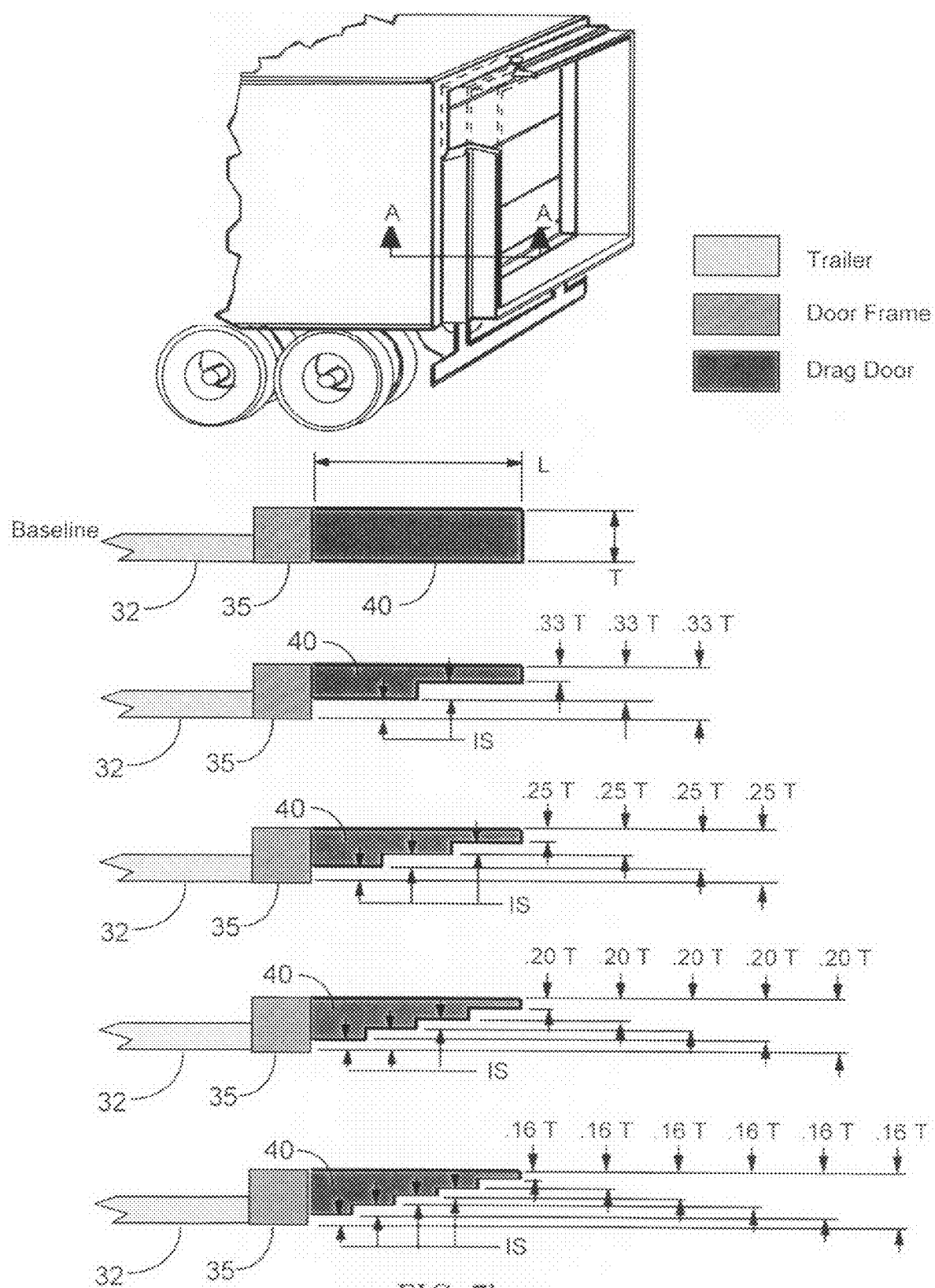

FIG. 7A shows a rear perspective view of the aft portion of a typical trailer 30 of a tractor-trailer truck with an alternate embodiment of the present invention 40 installed on the aft surface of rear frame 35 of a trailer 30. This alternate embodiment of the present invention 40 is a stepped inset shape that varies in inset dimensions IS and number of steps in the stream-wise direction of each of the four joined, orthogonal, aft-extended, thick panels that comprise the invention 40. The invention 40 is comprised of four joined, orthogonal, aft-extended, thick panels and attachment hardware that are mounted to the rear door frame 35 of the vehicle 30. Shown in FIG. 7B are horizontal section cuts through the trailer 30 and present invention 40 that show representative stepped inset geometries for each of the four panels comprising the invention 40.

The length L of the invention 40 is less than 60% of the width W of the vehicle 30. The width W and height H of the invention 40 is determined by the geometric characteristics of the vehicle 30, the operational requirements of the vehicle 30 and the maintenance requirements of the vehicle 30. The type, size and structure of the attachment hardware of the invention is determined by the geometric characteristics of the vehicle 30, the operational requirements of the vehicle 30 and the maintenance requirements of the vehicle 30.

The present invention 40 provides aerodynamic drag reduction for all free stream flow 100 conditions including crosswind conditions. Aerodynamic drag reduction occurs when flow 100 that leaves the vehicle top surface 34 and side surface 32, 33 trailing edges and separates at the first inset step resulting in a trapped vortex. As the flow moves aft along the outside surface of the present invention 40 the flow separates at each inset step and a trapped vortex will be formed. The existence of these trapped vortices improves the turning of the flow into the vehicles 30 base wake region. The trapped vortex generated at each step inset promotes the turning of the external flow into the base wake region which results in a stable bluff-base wake flow and a high pressure that acts on the base door 36 of the trailer 30. The effectiveness of the present invention to reduce drag and thereby increase fuel economy of a vehicle is determined by panel 40 width W, height H, length L, step inset dimension IS, and number of steps.

Figure 8A:
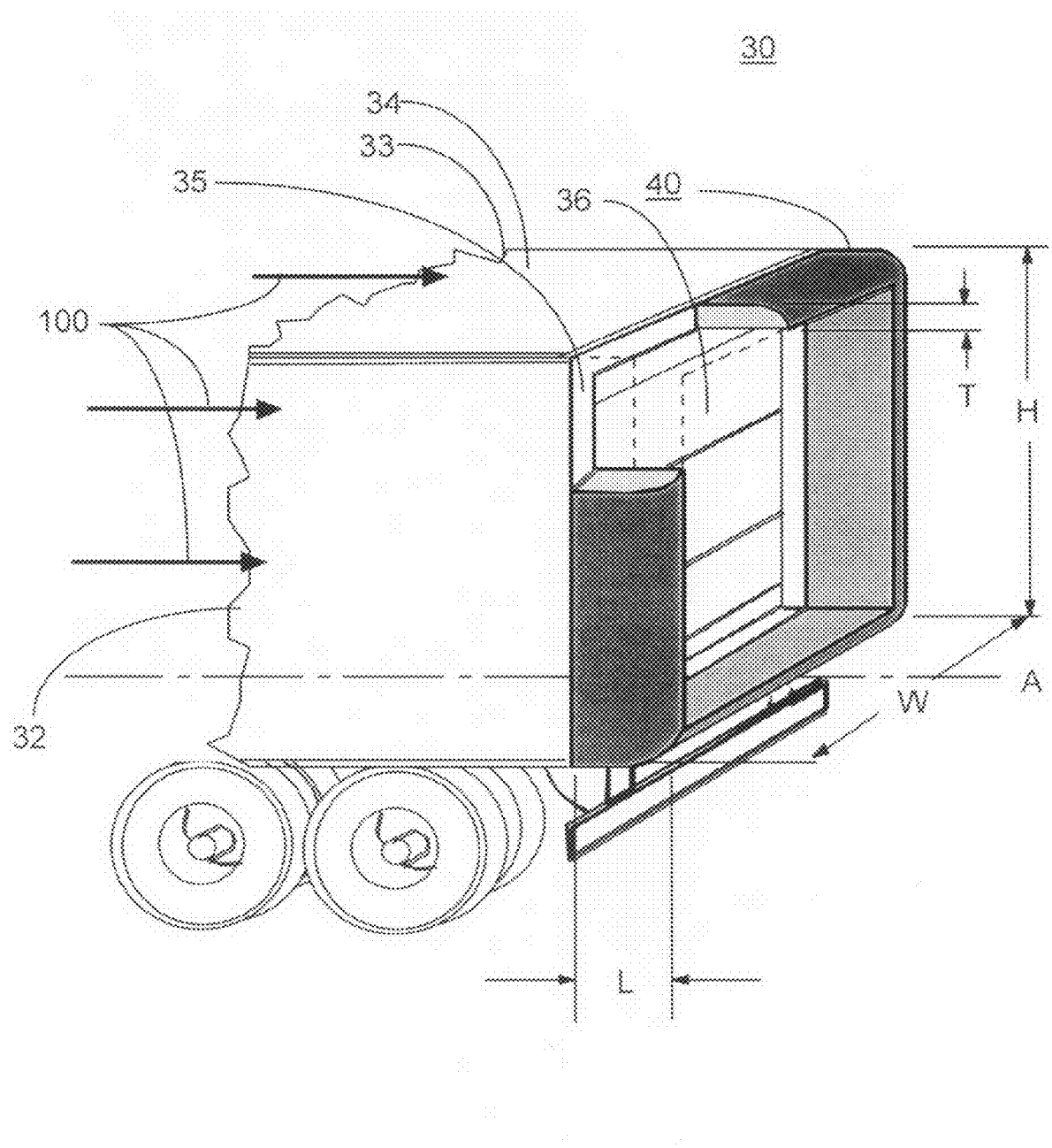
FIGS. 8A-8B are perspective and section view drawings of the radiused trailing edge variation for the present invention.
Figure 8B:
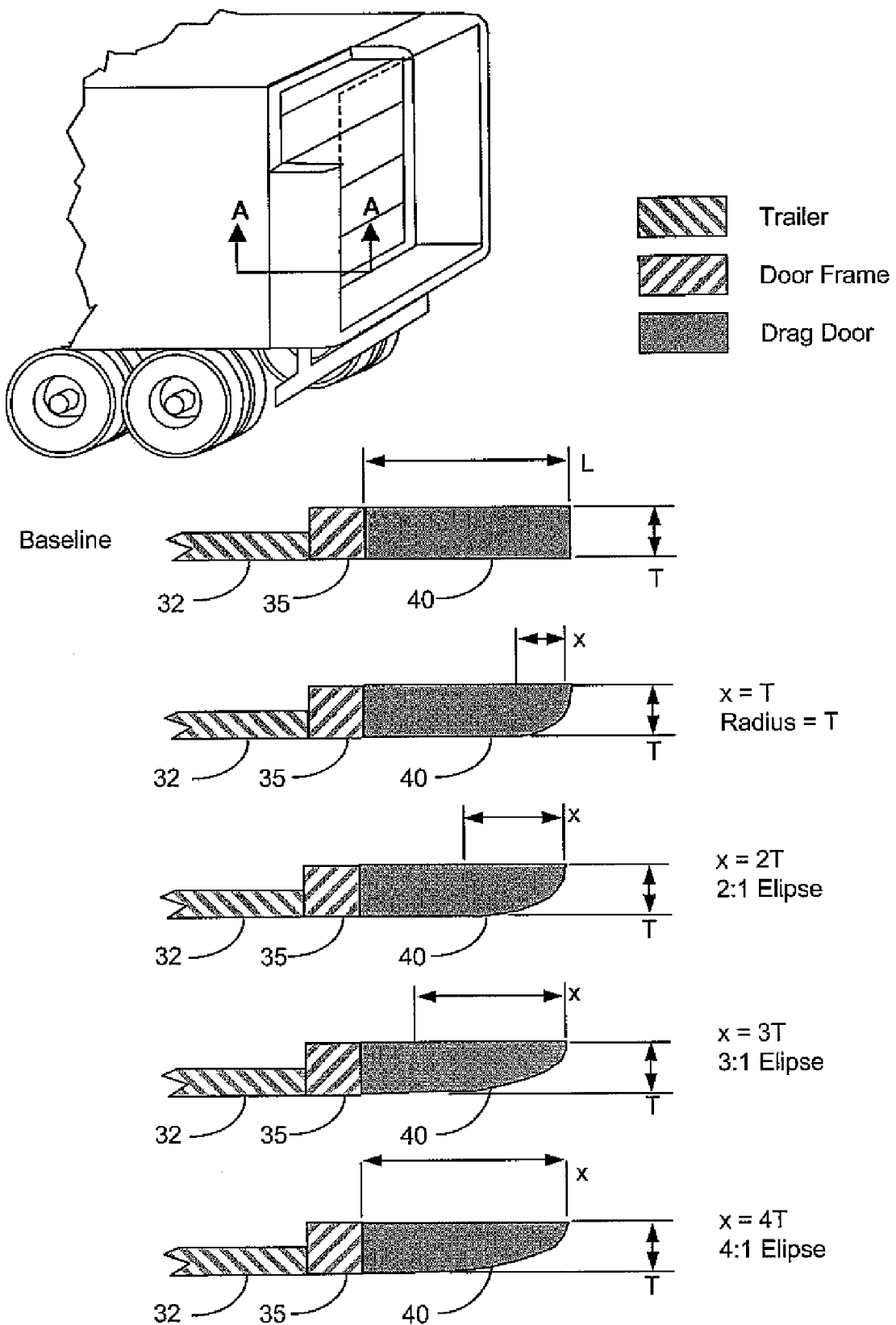

FIG. 8A shows a rear perspective view of the aft portion of a typical trailer 30 of a tractor-trailer truck with an alternate embodiment of the present invention 40 installed on the aft surface of rear frame 35 of a trailer 30. This alternate embodiment of the present invention 40 is a curved shaping of the outward facing surface and trailing edge region of each of the four joined, orthogonal, aft-extended, thick panels that comprise the invention 40. The curved shaping is in the stream-wise direction of each of the four joined, orthogonal, aft-extended, thick panels. The invention 40 is comprised of four joined, orthogonal, aft-extended, thick panels and attachment hardware that are mounted to the rear frame 35 of the vehicle 30. Shown in FIG. 8B are horizontal section cuts through the trailer 30 and present invention 40 that show representative curved shaping for each of the four panels comprising the invention 40.

The length L of the invention 40 is less than 60% of the width W of the vehicle 30. The width W and height H of the invention 40 is determined by the geometric characteristics of the vehicle 30, the operational requirements of the vehicle 30 and the maintenance requirements of the vehicle 30. The type, size and structure of the attachment hardware of the invention is determined by the geometric characteristics of the vehicle 30, the operational requirements of the vehicle 30 and the maintenance requirements of the vehicle 30.

The present invention 40 provides aerodynamic drag reduction for all free stream flow 100 conditions including crosswind conditions. Aerodynamic drag reduction occurs when flow 100 that leaves the vehicle top surface 34 and side surface 32, 33 trailing edges is turned by curved surface on the present invention 40 which improves the turning of the flow into the vehicles 30 base wake region. The flow 100 leaving the top surface 34 and side surface 32, 33 trailing edges remains attached as it moves stream-wise along the outer surface of the invention 40. The curved surface promotes the turning of the external flow into the base wake region which results in a stable bluff-base wake flow and a high pressure that acts on the base door 36 of the trailer 30. The effectiveness of the present invention to reduce drag and thereby increase fuel economy of a vehicle is determined by panel 40 width W, height H, and length L.

Figure 9A:
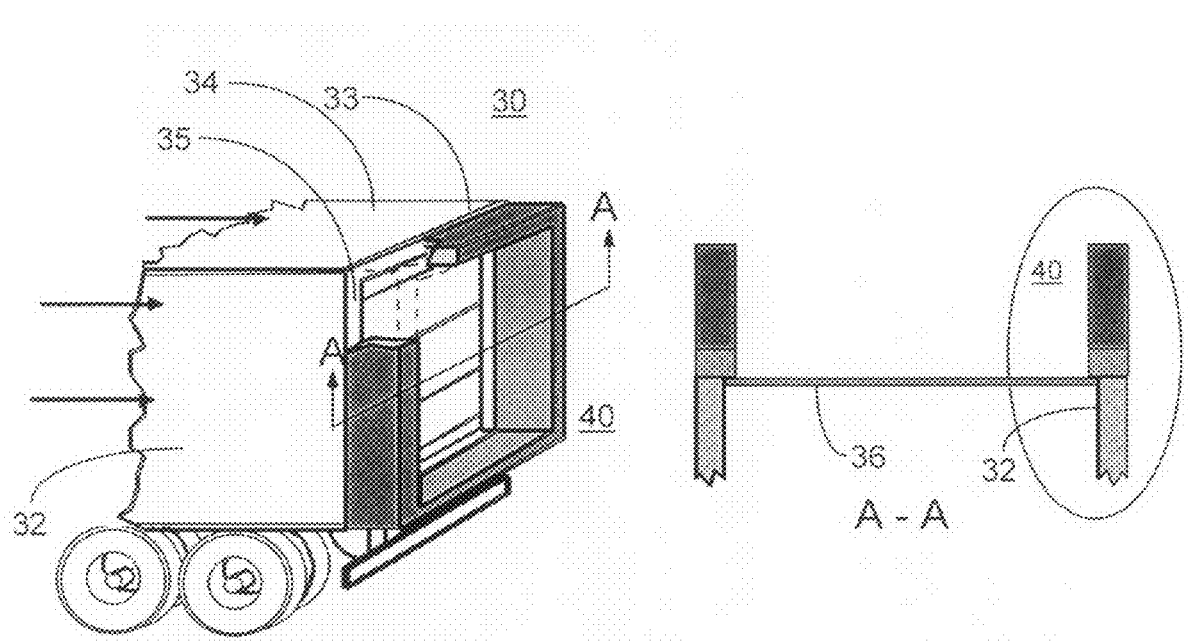
FIGS. 9A-9D are perspective view and cross section views of several fabrication concepts for the present invention.
Figure 9B:
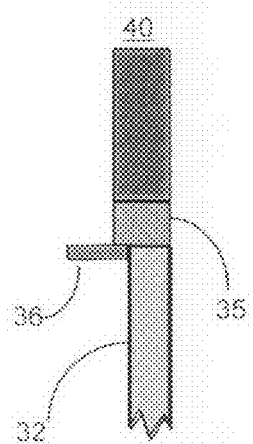
Figure 9C:
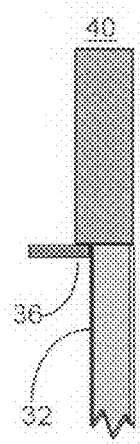
Figure 9D:
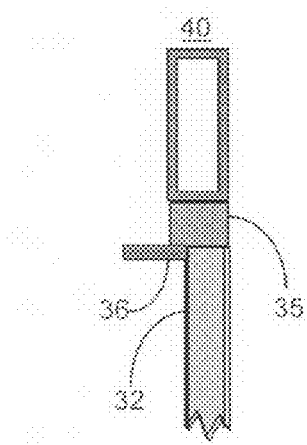

FIGS. 9A-9D are representative fabrication and attachment schemes for the present invention 40. In general, the device is substantially permanently attached to the aft surface of the vehicle. Thus, the device would not be easily removed and may be an integral part of the vehicle. FIG. 9A is a rear perspective view of the aft portion of a typical trailer 30 of a tractor-trailer truck showing the present invention 40 installed on the aft surface of rear frame 35 of a trailer 30. FIGS. 9B-9D show alternate fabrication and attachment methods of the present invention 40. The alternate fabrication and attachment methods are a function of the geometry of the trailer 30, the operational requirements of the vehicle 30 and the maintenance requirements of the vehicle 30. The present invention 40 is comprised of four joined, orthogonal, aft-extended, thick panels. FIG. 9B show the present invention 40 fabricated as a solid structure and the present invention attached to the trailer 30 rear door frame 35. The attachment of the present invention 40 fabricated from a solid material to the trailer 30 rear door frame 35 may be by permanent means, such as by welding, or by temporary means such as mechanical fasteners. FIG. 9C shows the present invention 40 fabricated as an integral part of the trailer 30 rear door frame 35. FIG. 9D shows the present invention 40 fabricated as a non-solid structure and the present invention attached to the trailer 30 rear door frame 35. The attachment of the present invention 40 fabricated from a solid material to the trailer 30 rear frame 35 may be by permanent means, such as by welding, or by temporary means such as mechanical fasteners.

From the description provided above, a number of features of the frame extension non-ventilated cavity device become evident:

The invention provides a device to reduce the drag of a bluff-base body vehicle.

(a) The invention uses vortices located on the base surface of a bluff-base body to reduce drag.

(b) The invention reduces the aerodynamic drag and improves the operational efficiency of bluff-base vehicles.

(c) The invention reduces the aerodynamic drag and improve the fuel efficiency of bluff-base vehicles.

(d) The invention conserves energy and improves the operational efficiency of bluff-base vehicles.

(e) The invention reduces the aerodynamic drag without a significant modification to the operational or maintenance requirements of existing bluff-base vehicles.

(f) The invention may be easily applied to any existing bluff-base vehicle or designed into any new bluff-base vehicle.

(g) The invention permits matching of complex surface shapes by the shaping and placement of the panels.

(h) Large reductions in drag force can be achieved by the trapping of vortices.

(i) The structure, placement, and shape of each aft extended panel may be adapted to meet specific performance or vehicle integration requirements.

(j) The trailing edge shape of each aft extended panel may be linear or complex to meet specific performance or vehicle integration requirements.

(k) Each aft extended panel may be optimally positioned on the vehicle rear surface.

(l) The weight and volume requirements within the vehicle may be minimized.

(m) Maintenance requirements may be minimized.

(n) The impact on operational and use characteristics of the vehicle door system may be minimized.

(o) The safety of the vehicle operation may be increased.

Accordingly, the device can be used to easily and conveniently reduce aerodynamic drag on any bluff base ground vehicle for the purposes of improving the operational performance of the vehicle. Furthermore, the four panels comprising the device have the additional features in that:

they provide an aerodynamic drag reduction force over the base of the vehicle;

they permit the contour of the host surface to be easily matched;

they permit easy application to any existing vehicle or may be designed to fit any existing vehicle;

they permit the device to be fabricated as an independent unit that may be applied to an existing surface;

the permit optimal positioning of each aft extended panel on the vehicle base surface;

they permit the design of a system with minimum weight and volume requirements within the vehicle;

they require minimal maintenance;

they cause minimal impact on door operation and use;

they permit the maximum safety of vehicle operation.

Although the description above contains many specificities, these should not be construed as limiting the scope of the invention but as merely providing illustrations of some of the presently preferred embodiments of this invention. For example, the outward projected panels can be composed of various planar shapes such as ellipsoid, quadratic, etc.; the thickness and width can vary along the length; the material can be any light-weight and structurally sound material such as wood, plastic, metal, composites, etc.; the substrate can be any metal, wood, plastic, composite, rubber, ceramic, etc.; the application surface can be that of a metal, wood, plastic, composite, rubber, ceramic, etc. The attachment hardware, attachment means, and attachment process can make use of either conventional off the shelf or designed specifically for the present invention.

The invention has been described relative to specific embodiments thereof and relative to specific vehicles, it is not so limited. The invention is considered applicable to any road vehicle including automobiles, trucks, buses, trains, recreational vehicles, sport utility vehicles, and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

What is claimed is:

1. An aerodynamic frame extension device for reducing the aerodynamic drag when attached to a rear frame of a bluff base vehicle, the aft surface of the rear frame having a perimeter with a top, bottom and two sides, the frame extension device comprising:
- four panels, wherein a top panel extends aft from the top, a bottom panel extends aft from the bottom, and the remaining two panels of the four panels comprise side panels with one side panel extending aft from one of the two sides and the remaining side panel extending aft of the other of the two sides, the four panels of the frame extension device being integrally connected to each other and substantially permanently affixed to the perimeter of the aft surface of the rear frame, extending aft from the rear frame; wherein the frame extension device has a vertical height equal to at least the vertical height of the rear frame and a width equal to at least the width of the rear frame; and
- wherein the bottom panel has sufficient thickness to support a device for loading and unloading the vehicle and the remaining panels have a thickness of at least 1% of the width of the vehicle;
- and wherein the rear frame perimeter, with a top, bottom and two sides, defines a door opening, and further wherein the frame extension device extends aft from the rear frame perimeter without interfering with the door opening.

2. The frame extension device of claim 1, wherein the top panel and the bottom panel are substantially orthogonal to the side panels.

3. The frame extension device of claim 1, wherein the panels are formed of a rigid material.

4. The frame extension device of claim 1, wherein the panels are formed of a rigid material selected from metal, wood, plastic, composite, rubber, and ceramic material.

5. The frame extension device of claim 1, wherein the bottom panel nearest the bottom of the door opening is formed of metal.

6. The frame extension device of claim 1, wherein the panels have an outer surface and the thickness of the panels varies in steps over panel length to form a stepped inset in the panel outer surface from the outer edge of the rear frame.

7. The frame extension device of claim 6, wherein the panel steps are inset at least one inch from the outer edge of the rear frame perimeter.

8. The frame extension device of claim 6, wherein the panels are inset from the outer edge of the rear frame at a distance of about 0-10% of the vehicle's width.

9. The frame extension device of claim 6, wherein the panels are inset from the outer edge of the rear frame at a distance of about 0-5% of the vehicle's width.

10. The frame extension device of claim 1, wherein the length of the device is about 6 to about 60 inches.

11. The frame extension device of claim 1, wherein the panels are rigid and are joined together into a single piece frame structure.

* * * * *